United States Patent
Alhooshani et al.

(10) Patent No.: US 12,215,025 B1
(45) Date of Patent: Feb. 4, 2025

(54) FIBROUS SILICA ZINC OXIDE-SUPPORTED NICKEL CATALYST FOR DRY REFORMING OF METHANE AND METHODS OF PREPARATION THEREOF

(71) Applicant: KING FAHD UNIVERSITY OF PETROLEUM AND MINERALS, Dhahran (SA)

(72) Inventors: Khalid Alhooshani, Dhahran (SA); Mohammed Mosaad Awad, Dhahran (SA); Ijaz Hussain, Dhahran (SA)

(73) Assignee: KING FAHD UNIVERSITY OF PETROLEUM AND MINERALS, Dhahran (SA)

( * ) Notice: Subject to any disclaimer, the term of this patent is extended or adjusted under 35 U.S.C. 154(b) by 0 days.

(21) Appl. No.: 18/774,551

(22) Filed: Jul. 16, 2024

(51) Int. Cl.
*C01B 3/26* (2006.01)
*B01J 23/80* (2006.01)
(Continued)

(52) U.S. Cl.
CPC ............ *C01B 3/26* (2013.01); *B01J 23/80* (2013.01); *B01J 35/58* (2024.01); *B01J 37/04* (2013.01);
(Continued)

(58) Field of Classification Search
CPC .............. C01B 3/26; B01J 35/58; B01J 23/80
See application file for complete search history.

(56) References Cited

U.S. PATENT DOCUMENTS

2023/0050019 A1* 2/2023 Lee .................. B01J 19/0093

FOREIGN PATENT DOCUMENTS

CN 117049474 A 11/2023
IN 436930 B 3/2023
(Continued)

OTHER PUBLICATIONS

Zhu "The promoting effect of La, Mg, Co and Zn on the activity and stability of Ni/SiO2 catalyst for CO2 reforming of methane" International journal of hydrogen energy 36 (2011) 7094-7104 (Year: 2011).*

(Continued)

*Primary Examiner* — Paul A Wartalowicz
(74) *Attorney, Agent, or Firm* — Oblon, McClelland, Maier & Neustadt, L.L.P.

(57) ABSTRACT

A method for dry reformation of methane (DRM) includes introducing a $H_2$-containing feed gas stream into a reactor, including a nickel-containing fibrous silica zinc oxide (Ni/FSZ) catalyst, passing the $H_2$-containing feed gas stream through the reactor to contact the $H_2$-containing feed gas stream with particles of the Ni/FSZ catalyst at a temperature of from 500 to 900 degrees Celsius (° C.) to form a reduced catalyst; terminating the introduction of the $H_2$-containing feed gas stream and introducing and passing a mixed feed gas stream including $CH_4$ and $CO_2$ through the reactor to contact the mixed feed gas stream with the reduced catalyst at a temperature of from 500 to 1000° C. thereby converting at least a portion of the $CH_4$ and $CO_2$ to $H_2$ and CO; and regenerating the Ni/FSZ catalyst particles to form a regenerated catalyst and producing a residue gas stream leaving the reactor.

20 Claims, 24 Drawing Sheets

(51) Int. Cl.
    *B01J 35/58*      (2024.01)
    *B01J 37/04*      (2006.01)
    *B01J 37/08*      (2006.01)
    *B01J 37/12*      (2006.01)

(52) U.S. Cl.
    CPC ............... *B01J 37/08* (2013.01); *B01J 37/12* (2013.01); *C01B 2203/0277* (2013.01); *C01B 2203/1058* (2013.01); *C01B 2203/1241* (2013.01)

(56) References Cited

FOREIGN PATENT DOCUMENTS

KR      10-1469455 B1    12/2014
WO    WO 2004/110622 A1    12/2004

OTHER PUBLICATIONS

Aziz "Lamellar-structured fibrous silica as a new engineered catalyst for enhancing CO2 methanation" Fuel 352 (2023) 129113 (Year: 2023).*

Aziz, M.A., et al., "Lamellar-structured fibrous silica as a new engineered catalyst for enhancing $CO_2$ methanation", ScienceDirect, vol. 352, 2023, 4 total pages.

Li, Z., et al., "Facile Synthesis of High Surface Area Yolk-Shell Ni@Ni Embedded $SiO_2$ via Ni Phyllosilicate with Enhanced Performance for $CO_2$ Reforming of $CH_4$,", ChemCatChem, vol. 7, No. 1, 2014, 2 total pages.

Zhu, J., et al., "The promoting effect of La, Mg, Co, Zn on the activity and stability of Ni/$SiO_2$ catalyst for $CO_2$ reforming of methane", ScienceDirect, vol. 36, No. 12, 2011, 3 total pages.

* cited by examiner

FIBROUS SILICA ZINC OXIDE-SUPPORTED NICKEL CATALYST FOR DRY REFORMING OF METHANE AND METHODS OF PREPARATION THEREOF

STATEMENT OF ACKNOWLEDGEMENT

Support provided by the Interdisciplinary Research Center for Refining & Advanced Chemicals, King Fahd University of Petroleum & Minerals, Dhahran 31261, Saudi Arabia, and the Department of Chemistry at King Fahd University of Petroleum and Minerals (KFUPM) for funding this work is gratefully acknowledged.

BACKGROUND

Technical Field

The present disclosure is directed toward catalysts for dry reforming of methane (DRM), particularly to a nickel-containing fibrous silica zinc oxide (Ni/FSZ) catalyst, and to a method for DRM using the nickel-containing fibrous silica zinc oxide catalyst.

Description of Related Art

The "background" description provided herein is to present the context of the disclosure generally. Work of the presently named inventors, to the extent it is described in this background section, as well as aspects of the description that may not otherwise qualify as prior art at the time of filing, are neither expressly nor impliedly admitted as prior art against the present invention.

The ongoing emission of the major greenhouse gas, carbon dioxide ($CO_2$), into the environment due to the combustion of substantial quantities of fossil fuels poses a significant challenge in combating global warming, driven by people's rising energy needs. In addition, methane ($CH_4$) is an even potent greenhouse gas, and its direct emission from fragmented resources like biogas, coke oven gas, and coalbed methane will worsen the climate effect while wasting resources. Research into catalytic technologies that enable the conversion of greenhouse gases into lucrative feedstocks has been pursued in response to the rising demand for clean energy solutions and environmentally friendly chemical processes. Among these technologies, the dry reforming of methane (DRM) offers a practical approach to reduce carbon emissions while producing syngas, a flexible precursor for manufacturing fuels and chemicals. Furthermore, by using the syngas produced by DRM directly as the feedstock gas in the carbonyl formation and Fischer-Tropsch processes, important liquid fuels, alcohols, and higher aliphatic aldehydes can be produced, minimizing the excessive reliance on fossil fuels.

The primary challenges in DRM have centered around the development and preparation of high-performance catalysts. Noble metals such as palladium, ruthenium, rhodium, and platinum have attracted interest due to their resistance to carbon deposition, high activity, and stability in the DRM process. However, these metals are inappropriate for large-scale industrial applications due to their high price and restricted availability. Due to its affordability and catalytic performance, transition metal nickel (Ni) may be utilized as an alternate active component in the application of DRM catalyst. Ni exhibits a capability in breaking the C—H bond and activating $CH_4$, resulting in Ni-based catalysts with enhanced catalytic activity compared to noble metal-based catalysts. Moreover, nickel-based catalysts offer the added advantages of abundant supply and low cost, making them more practical for industrial-scale DRM applications (See: J. ROSTRUPNIELSEN, "Mechanisms of carbon formation on nickel-containing catalysts," J Catal, vol. 48, no. 1-3, pp. 155-165, June 1977; R. Dębek, M. Motak, M. E. Galvez, T. Grzybek, and P. Da Costa, "Promotion effect of zirconia on Mg(Ni,Al)O mixed oxides derived from hydrotalcites in $CO_2$ methane reforming," Appl Catal B, vol. 223, pp. 36-46, April 2018; and O. U. Osazuwa, S. Z. Abidin, X. Fan, A. N. Amenaghawon, and M. T. Azizan, "An insight into the effects of synthesis methods on catalysts properties for methane reforming," J Environ Chem Eng, vol. 9, no. 2, p. 105052). However, under conditions of high-temperature (600 degrees Celsius (° C.)) reforming, Ni-based catalysts are susceptible to quickly deactivating due to sintering and deposition of carbon, in which deposition of carbon is brought on through the side reactions of Boudouard ($2CO \rightarrow CO_2+C$) and cracking of methane ($CH_4 \rightarrow 2H_2+C$), which restricts their commercial usage in DRM. The Ni particle's size had a substantial impact on the pace at which $CH_4$ cracked over the metallic Ni active site, with bigger particle sizes of Ni being more preferable for this process (See: J. B. Claridge, M. L. H. Green, and S. C. Tsang, "Methane conversion to synthesis gas by partial oxidation and dry reforming over rhenium catalysts," Catal Today, vol. 21, no. 2-3, pp. 455-460, December 1994). Recent studies have demonstrated that the formation of carbon deposition on smaller nickel particles is challenging due to the dynamic presence of oxygen species (such as Ni—O) on the surface of nickel. Additionally, the reduced particle size of nickel contributes to inhibiting carbon growth and nucleation.

To enhance the attachment and dispersion of active metallic Ni and to obtain smaller-sized Ni particles, selecting a proper foundation with a huge surface area and exceptional structural properties is essential. This will enhance the activity of catalysts based on Ni. Studies have been done to tune the routes and processes of interaction between metal-support, catalyst-reactants, and bimetallic to enhance and sustain the Ni particles' dispersion inside the support structure to avoid coking and sintering. One-pot metal-support synthesis allows for the containment of Ni particles within the mesoporous support materials matrix. As a result, a catalyst having a core-shell arrangement may be produced, with the support serving as the catalyst's protective shell and the active metals as its central. The support of mesoporous serves as a shell that inhibits sintering and the generation of coke and as the pathway for the gaseous reactant molecules to diffuse. Negative consequences of the formation of coke and prior attempts to prevent sintering have included using atomic layer deposition to build films, functionalizing metal nanoclusters over porous supports, coating mesoporous support shell structures, and alloying with metals that are extremely resistant to heat. Nevertheless, because of the mass transfer restriction and obstruction of active sites, these techniques typically decrease catalytic efficiency.

Fibrous silica nanostructures were developed at KAUST catalysis center (KCC-1) using a microemulsion approach followed by a microwave-assisted technique. Due to its large surface area and distinctive fibrous architecture, KCC-1 has recently found applications in energy storage, chromatographic separation, and drug delivery. Since its discovery, KCC-1 has been studies to enable broad applications. Because of its well-developed dendrimer networks, it has the innate capacity to reduce diffusion restriction and oppose Ostwald ripening of loaded metals, which promotes its uses in heterogeneous catalysis, i.e., Knoevenagel condensation, n-butyl levulinate production, Sabatier reaction, and Suzuki coupling. Because of its improved mass transfer and pore availability, KCC-1 shows enhanced performance over other mesoporous silicas, for example, MSN, SBA-15, MCM-41, and standard $SiO_2$.

Although several catalysts have been used in the past for DRM reactions, each of them suffers from one or more drawbacks that hinders their adoption. Hence, there is a need to develop more efficient DRM catalysts with enhanced effectiveness and to provide methods for incorporating these developed catalysts on an industrial scale for DRM.

In view of the foregoing, it is one objective of the present disclosure to provide a method for dry reforming of methane (DRM) in the presence of a catalyst. A second objective of the present disclosure is to provide a method of making the catalyst.

SUMMARY

In an exemplary embodiment, a method for dry reformation of methane (DRM) is disclosed. The method includes introducing a hydrogen ($H_2$)-containing feed gas stream into a reactor including a nickel-containing fibrous silica zinc oxide (Ni/FSZ) catalyst, passing the $H_2$-containing feed gas stream through the reactor to contact the $H_2$-containing feed gas stream with particles of the Ni/FSZ catalyst at a temperature of from 500 to 900 degrees Celsius (° C.) to form a reduced catalyst. Further, the method includes terminating the introduction of the $H_2$-containing feed gas stream and introducing and passing a mixed feed gas stream including methane ($CH_4$) and carbon dioxide ($CO_2$) through the reactor to contact the mixed feed gas stream with the reduced catalyst at a temperature of from 500 to 1000° C. thereby converting at least a portion of the $CH_4$ and $CO_2$ to $H_2$ and carbon monoxide (CO). The method further includes regenerating the Ni/FSZ catalyst particles to form a regenerated catalyst and producing a residue gas stream leaving the reactor.

In some embodiments, $H_2$ is present in the $H_2$-containing feed gas stream at a concentration of 1 to 20 volume percentage (vol. %) based on a total volume of the $H_2$-containing feed gas stream.

In some embodiments, the $H_2$-containing feed gas stream further includes an inert gas selected from the group consisting of nitrogen, argon, and helium.

In some embodiments, the mixed feed gas stream further includes an inert gas selected from the group consisting of nitrogen, argon, and helium.

In some embodiments, the reactor is at least one selected from the group consisting of a fixed-bed reactor, a trickle-bed reactor, a moving bed reactor, a rotating bed reactor, a fluidized bed reactor, and a slurry reactor.

In another exemplary embodiment, the reactor is disclosed. The reactor is a fluidized bed reactor in the form of a cylindrical reactor including a top portion, a cylindrical body portion, a bottom portion, and a housing having an open top and open bottom supportably maintained with the cylindrical body portion. The Ni/FSZ catalyst is supportably retained within the housing permitting fluid flow therethrough and at least one propeller agitator disposed in the bottom portion of the reactor. The bottom portion is cone-shaped or pyramidal and a plurality of recirculation tubes fluidly connects the bottom portion of the cylindrical reactor with the cylindrical body portion of the cylindrical reactor.

In some embodiments, the method includes passing of the $H_2$-containing feed gas stream through the reactor at a flow rate of about 10 to 30 milliliters per minute (mL/min) at a temperature of about 700° C.

In some embodiments, the method includes passing of the mixed feed gas stream through the reactor at a flow rate of about 10 mL/min to 30 mL/min.

In some embodiments, a weight ratio of $H_2$ to CO present in the residue gas stream is in a range of 0.001 to 2.0.

In some embodiments, the method has a $H_2$ yield of 10 to 90% based on $CH_4$ conversion at a temperature of from 700 to 1000° C. The $CH_4$ conversion is based on an initial concentration of the $CH_4$ in the mixed feed gas stream.

In some embodiments, the method has a CO yield of 5 to 49% based on a conversion of $CH_4$ and $CO_2$ at a temperature of from 700 to 1000° C. The conversion of $CH_4$ and $CO_2$ is based on an initially combined concentration of the $CH_4$ and $CO_2$ present in the mixed feed gas stream.

In another exemplary embodiment, a method of preparing a Ni/FSZ catalyst is disclosed. The method includes preparing the Ni/FSZ catalyst by mixing a nickel (Ni) salt, a fibrous silica zinc oxide (FSZ) catalyst, and water to form a first mixture. The method of preparing the Ni/FSZ catalyst further includes drying and calcining the first mixture at a temperature of about 700° C.

In some embodiments, the Ni salt includes nickel sulfate, nickel acetate, nickel citrate, nickel iodide, nickel chloride, nickel perchlorate, nickel nitrate, nickel phosphate, nickel triflate, nickel bis(trifluoromethanesulfonyl)imide, nickel tetrafluoroborate, nickel bromide, and/or its hydrate.

In some embodiments, the Ni/FSZ catalyst includes about 15 to 35 wt. % of Zn, 2 to 15 wt. % of Ni, 28 to 48 wt. % of oxygen (O), and 20 to 40 wt. % of silica (Si) as determined by energy-dispersive X-ray spectroscopy (EDS), and each wt. % based on a total weight of the Ni/FSZ catalyst.

In some embodiments, the FSZ catalyst includes about 5 to 30 wt. % of Zn as determined by EDS, and each wt. % based on a total weight of the FSZ catalyst.

In some embodiments, the FSZ catalyst has a porous structure including a plurality of spherical-like lamellar particles having an average particle size of 300 to 500 micrometers (μm).

In some embodiments, each of the plurality of spherical-like lamellar particles includes a fibrous network of interconnected rounded-shaped nanospheres and cockscomb-like nanostructures.

In yet another exemplary embodiment, a method of preparation of the FSZ catalyst is disclosed. The method includes mixing urea, a quaternary ammonium surfactant, toluene, an alcohol solvent, and water to form a second mixture. The method further includes mixing zinc oxide (ZnO), a tetraalkyl orthosilicate, and the second mixture at a temperature of from 100 to 150° C. to form a third mixture. The method further includes calcining the third mixture at a temperature of about 500 to 600° C.

In some embodiments, the quaternary ammonium surfactant is at least one selected from the group consisting of cetyltrimethylammonium bromide (CTAB), cetyltrimethylammonium chloride (CTACl), tetradecyltrimethylammonium bromide (TTAB), tetradecyltrimethylammonium chloride (TTACl), dodecyltrimethylammonium bromide (DTAB), dodecyltrimethylammonium chloride (DTACl), dodecylethyldimethylammonium bromide (DEDTAB), decyltrimethylammonium bromide (DTAB), and dodecyltriphenylphosphonium bromide (DTPB).

In some embodiments, the tetraalkyl orthosilicate is at least one selected from the group consisting of tetraethyl orthosilicate (TEOS), tetramethyl orthosilicate, tetrapropyl orthosilicate, and tetrabutyl orthosilicate.

The foregoing general description of the illustrative present disclosure and the following detailed description thereof are merely exemplary aspects of the teachings of this disclosure and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Figure 1A:
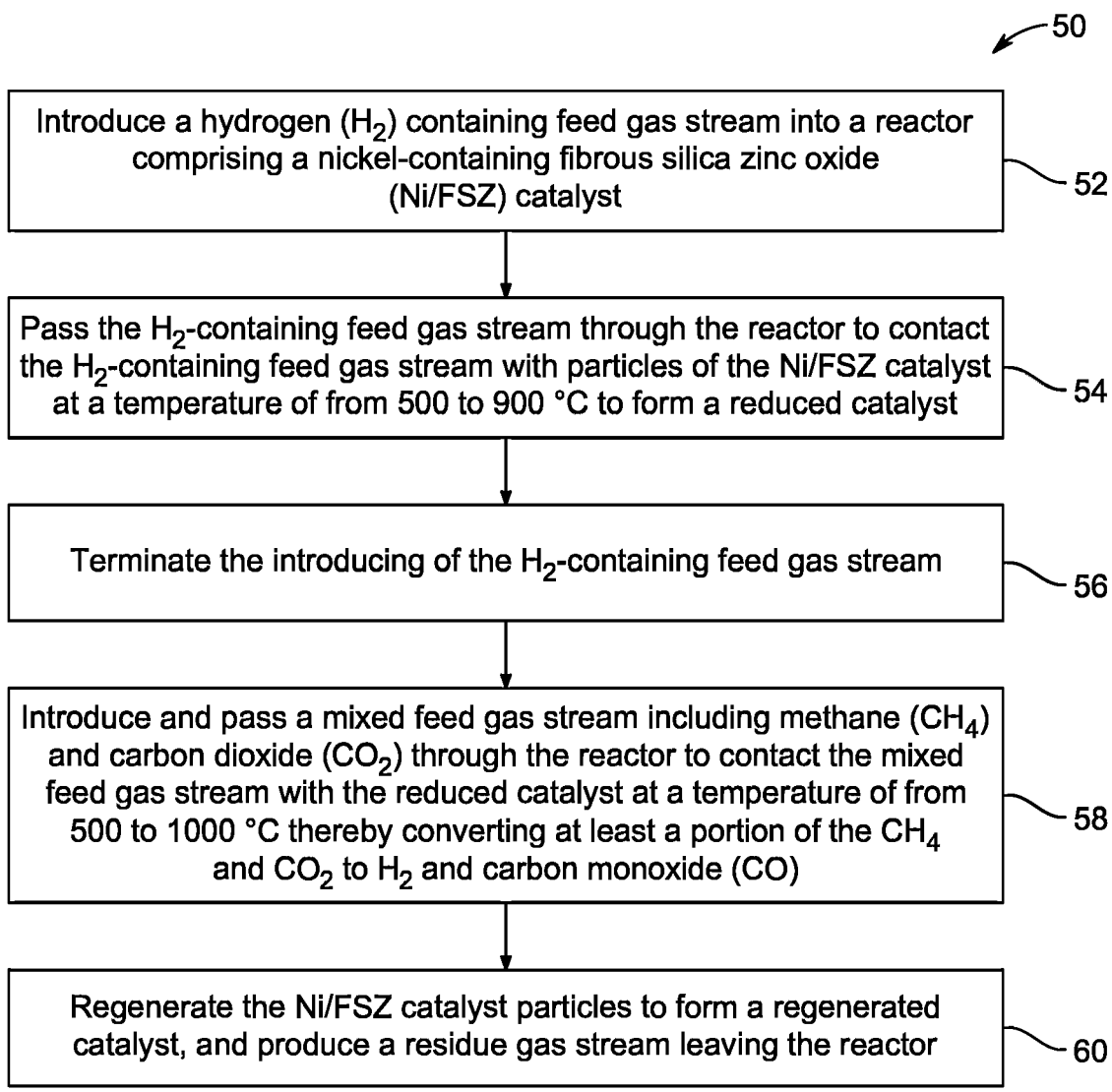
FIG. 1A is a flowchart depicting a method for the dry reforming of methane (DRM), according to certain embodiments.

When describing the present disclosure, the terms used are to be construed in accordance with the following definitions, unless a context dictates otherwise. Embodiments of the present invention will now be described more fully hereinafter with reference to the accompanying drawings wherever applicable, in that some, but not all embodiments of the disclosure are shown.

In the drawings, reference numerals designate identical or corresponding parts throughout the several views. Further, as used herein, the words "a," "an" and the like generally carry a meaning of "one or more," unless stated otherwise.

As used herein, the words "about," "approximately," or "substantially similar" may be used when describing magnitude and/or position to indicate that the value and/or position described is within a reasonable expected range of values and/or positions. For example, a numeric value may have a value that is +/−0.1% of the stated value (or range of values), +/−1% of the stated value (or range of values), +/−2% of the stated value (or range of values), +/−5% of the stated value (or range of values), +/−10% of the stated value (or range of values), +/−15% of the stated value (or range of values), or +/−20% of the stated value (or range of values). Within the description of this disclosure, where a numerical limit or range is stated, the endpoints are included unless stated otherwise. Also, all values and subranges within a numerical limit or range are specifically included as if explicitly written out.

The use of the terms "include," "includes", "including," "have," "has," or "having" should be generally understood as open-ended and non-limiting unless specifically stated otherwise.

As used herein, the term "room temperature" or "ambient temperature" generally refers to a temperature in a range of 25 degrees Celsius (° C.)±3° C. in the present disclosure.

As used herein, the term "porosity" refers to a measure of the void or vacant spaces within a material.

As used herein, the terms "particle size" and "pore size" may be thought of as the lengths or longest dimensions of a particle and of a pore opening, respectively.

As used herein, the term "sonication" generally refers to the process in which sound waves are used to agitate particles in a solution.

As used herein the term "de-ionized water" generally refers to the water that has (most of) the ions removed.

As used herein, the term "calcination" generally refers to heating a compound to a high temperature, under a restricted supply of ambient oxygen. This is performed to remove impurities or volatile substances and to incur thermal decomposition.

A weight percent of a component, unless specifically stated to the contrary, is based on the total weight of the formulation or composition in which the component is included. For example, if a particular element or component in a composition or article is said to have 5 wt. %, it is understood that this percentage is in relation to a total compositional percentage of 100%.

As used herein, "compound" refers to a chemical entity, whether as a solid, liquid, or gas, and whether in a crude mixture or isolated and purified.

The present disclosure is intended to include all isotopes of a given compound or formula, unless otherwise noted. The present disclosure is intended to include all hydration states of a given compound or formula, unless otherwise noted or when heating a material.

Aspects of the present disclosure are directed toward a method for making a fibrous silica zinc oxide (FSZ) catalyst and a nickel-containing FSZ catalyst (Ni/FSZ) with varied nickel content using a microemulsion technique, and an FSZ catalyst product formed by the method. The FSZ catalyst and the Ni-FSZ catalyst were tested for their stability and catalytic activity in a fixed bed reactor under various reaction conditions, for dry reforming of methane (DRM). The Ni/FSZ catalyst exhibited improved catalytic efficiency with $CO_2$ and methane conversions and superior selectivity towards syngas production. The catalyst also demonstrated improved stability and resistance to carbon deposition during prolonged reaction times.

FIG. 1A illustrates a flow chart of a method 50 for DRM. The order in which the method 50 is described is not intended to be construed as a limitation, and any number of the described method steps can be combined in any order to implement the method 50. Additionally, individual steps may be removed or skipped from the method 50 without departing from the spirit and scope of the present disclosure.

At step 52, the method 50 includes introducing a $H_2$-containing feed gas stream into a reactor including a nickel-containing fibrous silica zinc oxide (Ni/FSZ) catalyst. The $H_2$-containing feed gas stream includes $H_2$ at a concentration of 1-20 volume percentage (vol. %), preferably 1-19 vol. %, preferably 2-18 vol. %, preferably 3-17 vol. %, preferably 4-16 vol. %, preferably 5-15 vol. %, preferably 6-14 vol. %, preferably 7-13 vol. %, preferably 8-12 vol. %, and preferably 9-11 vol. %, based on the total volume of the $H_2$-containing feed gas stream. Other ranges are also possible. In a specific embodiment, the $H_2$-containing feed gas stream includes $H_2$ at a concentration of 10 vol. %, based on the total volume of the $H_2$-containing feed gas stream. In some embodiments, the $H_2$-containing feed gas stream may further include an inert gas like argon or helium, preferably argon. In some preferred embodiments, the inert gas is argon. The concentration of the inert gas, preferably argon, in the $H_2$-containing feed gas stream may be in the range of 80-99 vol. %, preferably 81-99 vol. %, preferably 82-98 vol. %, preferably 83-97 vol. %, preferably 84-96 vol. %, preferably 85-95 vol. %, preferably 86-94 vol. %, preferably 87-93 vol. %, preferably 88-92 vol. %, preferably 89-91 vol. %, preferably 90 vol. % based on the total volume of the $H_2$-containing feed gas stream. Other ranges are also possible. In some embodiments, the volume ratio of $H_2$ to the inert gas present in the $H_2$-containing feed gas stream is in a range of 1:1 to 1:20, preferably 1:2 to 1:18, preferably 1:3 to 1:15, preferably 1:4 to 1:10, preferably 1:5 to 1:9, preferably 1:9. Other ranges are also possible.

The reactor is at least one selected from the group consisting of a fixed-bed reactor, a trickle-bed reactor, a moving bed reactor, a rotating bed reactor, a fluidized-bed reactor, and a slurry reactor. In a specific embodiment, the reactor is a fluidized-bed reactor. In an embodiment, the reactor is the fluidized bed reactor in the form of a cylindrical reactor, including a top portion, a cylindrical body portion, a bottom portion, and a housing having an open top and open bottom supportably maintained with the cylindrical body portion. In some embodiments, the catalyst is supportably retained within the housing permitting fluid flow therethrough. In some embodiments, the bottom portion is cone-shaped or pyramidal. In some embodiments, at least one propeller agitator is disposed of in the bottom portion of the reactor. In some embodiments, a plurality of recirculation tubes fluidly connects the bottom portion of the cylindrical reactor with the cylindrical body portion of the cylindrical reactor. In some embodiments, at least one propeller agitator disposed in the bottom portion of the reactor.

The $H_2$ in the $H_2$-containing feed gas stream comes in contact with the catalyst in the reactor. The catalyst is at least one of a FSZ catalyst, and Ni/FSZ catalyst. In an embodiment, the catalyst is the FSZ catalyst. The FSZ catalyst includes about 5-30 wt. %, preferably 6-29 wt. %, preferably 7-28 wt. %, preferably 8-27 wt. %, preferably 9-26 wt. %, preferably 10-25 wt. %, preferably 11-24 wt. %, preferably 12-23 wt. %, preferably 13-22 wt. %, preferably 14-21 wt. %, preferably 15-20 wt. %, preferably 16-19 wt. %, and preferably 17-18 wt. % of zinc (Zn) as determined by energy-dispersive X-ray spectroscopy (EDS), and each wt. % based on the total weight of the FSZ catalyst. Other ranges are also possible. In a preferred embodiment, the FSZ catalyst of the present disclosure includes about 13.2 wt. % of Zn as determined by EDS, and each wt. % based on the total weight of the FSZ catalyst. Other ranges are also possible.

In some embodiments, the FSZ catalyst has a porous structure including a plurality of spherical-like lamellar particles having an average particle size of 300-500 micrometers (μm), preferably 310-490 μm, preferably 320-480 μm, preferably 330-470 μm, preferably 340-460 μm, preferably 350-450 μm, preferably 360-440 μm, preferably 370-430 μm, preferably 380-420 μm, and preferably 390-410 μm. Other ranges are also possible.

In an alternate embodiment, the FSZ catalyst may exist in various morphological shapes, such as cones, cuboidal, pyramidical, cylindrical, wires, crystals, rectangles, triangles, prisms, disks, cubes, ribbons, blocks, beads, discs, barrels, granules, whiskers, flakes, foils, powders, boxes, stars, flowers, polygonal like trigonal, pentagonal, hexagonal, etc., and mixtures thereof. The porous structure includes pores that may be micropores, mesopores, macropores, and/or a combination thereof. In some embodiments, each of the plurality of spherical-like lamellar particles includes a fibrous network of interconnected rounded-shaped nanospheres and cockscomb-like nanostructures. In some embodiments, each of the plurality of spherical particles includes a fibrous network of interconnected cockscomb-like nanoparticles having an average diameter of 0.5-25 nanometers (nm), preferably 1-24 nm, preferably 2-23 nm, preferably 3-22 nm, preferably 4-21 nm, preferably 5-20 nm, preferably 6-19 nm, preferably 7-18 nm, preferably 8-17 nm, preferably 9-16 nm, preferably 10-15 nm, preferably 11-14, and preferably 12-13 nm. Other ranges are also possible.

In a preferred embodiment, the catalyst is the Ni/FSZ catalyst. In some embodiments, the Ni/FSZ catalyst includes about 15-35 wt. % of Zn, preferably 15-35 wt. %. preferably 16-34 wt. %. preferably 17-33 wt. %. preferably 18-32 wt. %. preferably 19-31 wt. % preferably 20-30 wt. % preferably 21-29 wt. % preferably 22-28 wt. % preferably 23-27 wt. % and preferably 24-26 wt. % of Zn; 2-15 wt. % of Ni, preferably 3-14 wt. %, preferably 4-13 wt. %, preferably 5-12 wt. %, preferably 6-11 wt. %, preferably 7-10 wt. %, and preferably 8-9 wt. % of Ni; 28-48 wt. % of oxygen (O), preferably 29-47 wt. %, preferably 30-46 wt. %, preferably 31-45 wt. %, preferably 32-44 wt. %, preferably 33-43 wt. %, preferably 34-42 wt. %, preferably 35-41 wt. %, preferably 36-40 wt. %, and preferably 37-39 wt. % 0; and 20 to 40 wt. % of silica (Si), preferably 21-39 wt. %, preferably 22-38 wt. %, preferably 23-37 wt. %, preferably 24-36 wt. %, preferably 25-35 wt. %, preferably 26-34 wt. %, preferably 27-33 wt. %, preferably 28-32 wt. %, and preferably 29-31 wt. % of Si as determined by EDS, and each wt. % based on the total weight of the Ni/FSZ catalyst. Other ranges are also possible. In a preferred embodiment, the Ni/FSZ catalyst includes about 25.1 wt. % of Zn, 6.1 wt. % of Ni, 38.5 wt. % O, and 30.2 wt. % of Si as determined by EDS, and each wt. % is based on the total weight of the Ni/FSZ catalyst. Other ranges are also possible.

The crystalline structures of Ni/FSZ catalyst with various Ni content may be characterized by X-ray diffraction (XRD). In some embodiments, the XRD patterns are collected in a Powder X-ray diffraction (XRD, Bruker D8 Advance diffractometer) equipped with a Cu—Kα radiation source ($\lambda$=0.15406 nm) for a 2θ range extending between 20 and 80°, further preferably 30 and 60° at an angular rate of 0.005 to 0.04° $s^{-1}$, preferably 0.01 to 0.03° $s^{-1}$, or even preferably 0.02° $s^{-1}$.

Figure 5:
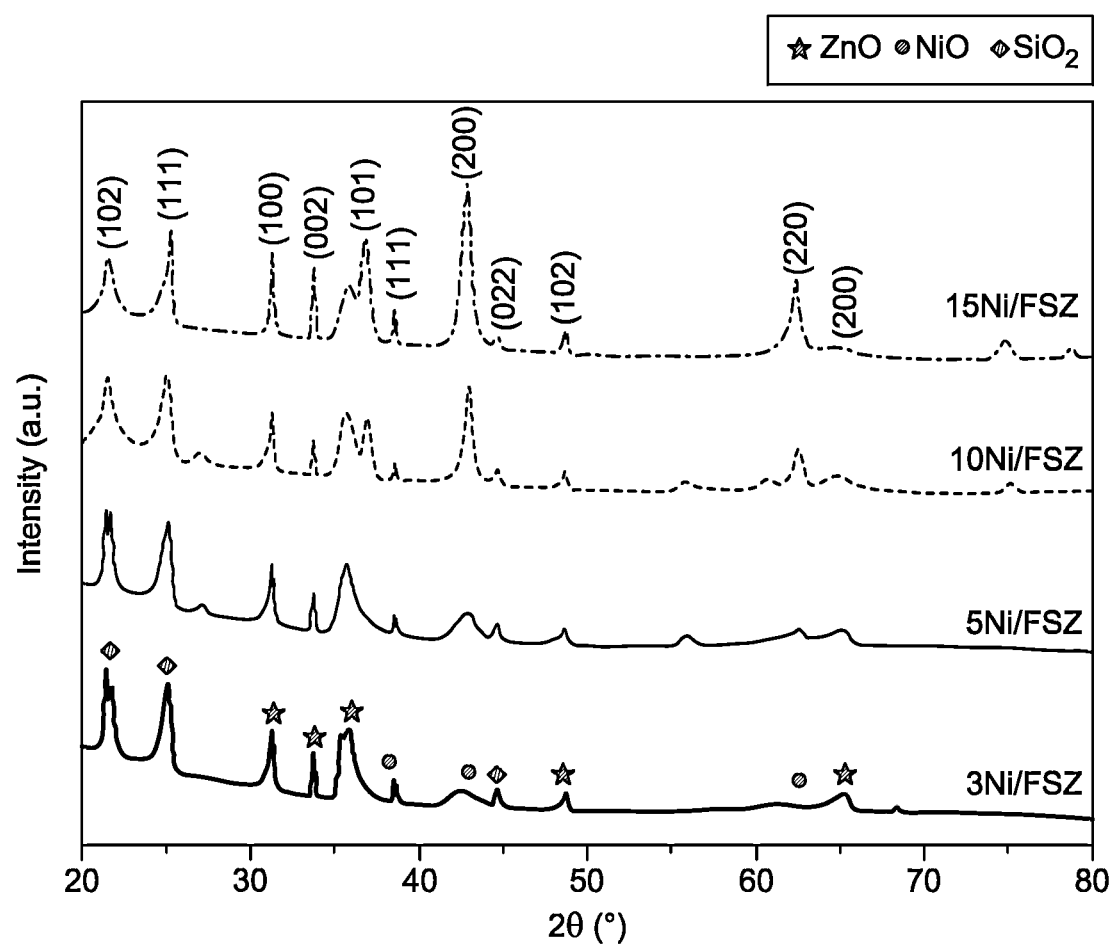
FIG. 5 depicts an X-ray diffraction (XRD) pattern of the Ni/FSZ catalyst with nickel loading 3%, 5%, 10%, and 15% to determine crystallinity and structure, according to certain embodiments.

In some embodiments, the Ni/FSZ catalyst has intense peaks with a 2 theta (θ) value in a range of from 20 to 23°, preferably about 21.5°; from 23.8 to 24.8°, preferably about 24.3°; from 30.2 to 31.3°, preferably about 30.7°; from 31.5 to 32.6°, preferably about 32.1°; from 35 to 39.5°, preferably about 37.5°, from 42.8 to 43.8°, preferably about 43.3°; from 54.5 to 55.8°, preferably about 55.1°; from 62.5 to 63.6°, preferably about 63.1°; and from 70 to 73°, preferably about 71.7° in an X-ray diffraction (XRD) spectrum, as depicted in FIG. 5. Other ranges are also possible.

At step 54, method 50 includes passing the $H_2$-containing feed gas stream through the reactor to contact the $H_2$-containing feed gas stream with particles of the Ni/FSZ catalyst at a temperature of from 500-900 degrees Celsius (° C.), preferably 510-890° C., preferably 520-880° C., preferably 530-870° C., preferably 540-860° C., preferably 550-850° C., preferably 560-840° C., preferably 570-830° C., preferably 580-820° C., preferably 590-810° C., preferably 600-800° C., preferably 610-790° C., preferably 620-780° C., preferably 630-770° C., preferably 640-760° C., preferably 650-750° C., preferably 660-740° C., preferably 670-730° C., preferably 680-720° C., preferably 690-710° C., to form a reduced catalyst. Other ranges are also possible. In a specific embodiment, the $H_2$-containing feed gas stream is passed through the reactor to contact the $H_2$-containing feed gas stream with particles of the catalyst at a temperature of 700° C. to form a reduced catalyst. The process described thus far results in catalyst activation by reduction.

In some embodiments, the $H_2$-containing feed gas stream is passed through the reactor at a flow rate of about 10-30 milliliters per minute (mL/min), preferably 11-29 mL/min, preferably 12-28 mL/min, preferably 13-27 mL/min, preferably 14-26 mL/min, preferably 15-25 mL/min, preferably 16-24 mL/min, preferably 17-23 mL/min, preferably 18-22 mL/min, and preferably 19-21 mL/min at a temperature of about 700° C. Other ranges are also possible. In a specific embodiment, the $H_2$-containing feed gas stream is passed through the reactor at a flow rate of about 20 mL/min at a temperature of about 700° C. Other ranges are also possible.

At step 56, method 50 includes terminating the introduction of the $H_2$-containing feed gas stream. Once the catalyst is activated, the supply of $H_2$ to the reactor is stopped. The $H_2$ in the reactor is removed by purging the reactor under a continuous flow of an inert gas, preferably nitrogen, preferably argon, and more preferably helium. In a specific embodiment, the reactor is purged under a continuous flow of argon.

At step 58, the method 50 includes introducing and passing a mixed feed gas stream, including methane ($CH_4$) and carbon dioxide ($CO_2$), through the reactor to contact the mixed feed gas stream with the reduced catalyst at a temperature of from 500-1000° C., preferably 525-975° C., preferably 550-950° C., preferably 575-925° C., preferably 600-900° C., preferably 625-875° C., preferably 650-850° C., preferably 675-825° C., preferably 700-800° C., and preferably 725-775° C. thereby converting at least a portion of the $CH_4$ and $CO_2$ to hydrogen ($H_2$) and carbon monoxide (CO). Other ranges are also possible. In some embodiments, the mixed feed gas stream further includes an inert gas selected from the group consisting of nitrogen, argon, and helium. In some embodiments, the passing the mixed feed gas stream through the reactor is carried out at a flow rate of about 10-30 mL/min, preferably 11-29 mL/min, preferably 12-28 mL/min, preferably 13-27 mL/min, preferably 14-26 mL/min, preferably 15-25 mL/min, preferably 16-24 mL/min, preferably 17-23 mL/min, preferably 18-22 mL/min, and preferably 19-21 mL/min. In a specific embodiment, the mixed feed gas stream is passed through the reactor at a flow rate of about 20 mL/min. Other ranges are also possible. During this reaction, at least a portion of the catalyst particles from the reduced catalyst are spent to convert $CH_4$ and $CO_2$ to $H_2$ and CO. These catalyst particles may be regenerated for further re-use.

At step 60, the method 50 includes regenerating the catalyst particles to form a regenerated catalyst and producing a residue gas stream leaving the reactor. The catalytic particles may be regenerated by any method known to a person skilled in the art—for example, thermal treatment. The residue gas stream leaving the reactor includes $H_2$ and CO. The weight ratio of $H_2$ to CO present in the residue gas stream is in a range of 0.001-2.0, 0.01-1.9, 0.05-1.8, 0.1-1.7, 0.2-1.6, 0.3-1.5, 0.4-1.4, preferably 0.5-1.3, preferably 0.6-1.2, preferably 0.7-1.1, and preferably 0.8-1.0. Other ranges are also possible. In a preferred embodiment, the weight ratio of $H_2$ to CO present in the residue gas stream is 1.94. Other ranges are also possible.

The method of the present disclosure has a $H_2$ yield of about 10-90%, preferably 15-85%, preferably 20-80%, preferably 25-75%, preferably 30-70%, preferably 35-65%, preferably 40-60%, and preferably 45-55% based on $CH_4$ conversion at a temperature from 700-1000° C., preferably 725-975° C., preferably 750-950° C., preferably 775-925° C., preferably 800-900° C., and preferably 825-875° C. Other ranges are also possible. The $CH_4$ conversion is based on an initial concentration of the $CH_4$ in the mixed feed gas stream. In some embodiments, the method has a CO yield of 5-49%, preferably 10-45%, preferably 15-40%, preferably 20-35%, and preferably 25-30%, based on a conversion of $CH_4$ and $CO_2$ at a temperature from 700-1000° C., preferably 725-975° C., preferably 750-950° C., preferably 775-925° C., preferably 800-900° C., and preferably 825-875° C. Other ranges are also possible. The conversion of $CH_4$ and $CO_2$ is based on an initially combined concentration of the $CH_4$, and $CO_2$ present in the mixed feed gas stream.

In some embodiments, the Ni/FSZ catalyst contains about 3 to 15 wt. % of Ni based on the total weight of the Ni/FSZ catalyst. In one embodiment, the Ni/FSZ catalyst with about 3 wt. % of Ni (3Ni/FSZ) has a $CO_2$ conversion of about 15 to 25%, preferably about 20%, and a $CH_4$ conversion of about 15 to 25%, preferably about 20%, each based on an initial concentration of the $CO_2$ and $CH_4$ present in the mixed feed gas stream respectively at a temperature of about 550° C. In one embodiment, the Ni/FSZ catalyst with about 5 wt. % of Ni (5Ni/FSZ) has a $CO_2$ conversion of about 25 to 35%, preferably about 30%, and a $CH_4$ conversion of about 30 to 40%, preferably about 35%, each based on an initial concentration of the $CO_2$ and $CH_4$ present in the mixed feed gas stream respectively at a temperature of about 550° C. In one embodiment, the Ni/FSZ catalyst with about 10 wt. % of Ni (10Ni/FSZ) has a $CO_2$ conversion of about 15 to 25%, preferably about 20%, and a $CH_4$ conversion of about 15 to 25%, preferably about 20%, each based on an initial concentration of the $CO_2$ and $CH_4$ present in the mixed feed gas stream respectively at a temperature of about 550° C. In one embodiment, the Ni/FSZ catalyst with about 15 wt. % of Ni (15Ni/FSZ) has a $CO_2$ conversion of about 15 to 25%, preferably about 20%, and a $CH_4$ conversion of about 15 to 25%, preferably about 20%, each based on an initial concentration of the $CO_2$ and $CH_4$ present in the mixed feed gas stream respectively at a temperature of about 550° C. Other ranges are also possible.

In some preferred embodiments, the 10Ni/FSZ catalyst may enhance the $CO_2$ conversion by at least 1 time, preferably at least 2 times, or even more preferably at least 4 times that that of a FSZ catalyst in the absence of Ni. In some further preferred embodiments, the 10Ni/FSZ catalyst may enhance the $CH_4$ conversion by at least 1 time, preferably at least 2 times, or even more preferably at least 4 times than that of a FSZ catalyst in the absence of Ni. Other ranges are also possible.

In some preferred embodiments, the 10Ni/FSZ catalyst may enhance the $CO_2$ conversion by at least 50%, preferably at least 80%, or even more preferably at least 100% than that of a catalyst selected from the group consisting of 3Ni/FSZ catalyst, 5Ni/FSZ catalyst, and 15Ni/FSZ catalyst. In some further preferred embodiments, the 10Ni/FSL catalyst may enhance the $CH_4$ conversion by at least 50%, preferably at least 80%, or even more preferably at least 100% than that of a catalyst selected from the group consisting of 3Ni/FSZ catalyst, 5Ni/FSZ catalyst, and 15Ni/FSZ catalyst. Other ranges are also possible.

Figure 1B:
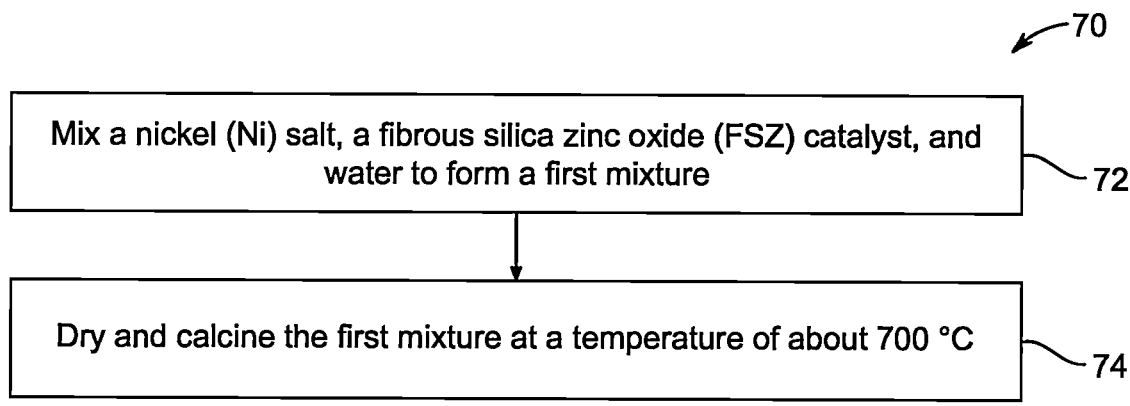
FIG. 1B is a flowchart depicting a method for preparing nickel-containing fibrous silica zinc oxide (Ni/FSZ) catalyst, according to certain embodiments.

FIG. 1B illustrates a flow chart of a method 70 for preparing the Ni/FSZ catalyst. The order in which the method 70 is described is not intended to be construed as a limitation, and any number of the described method steps can be combined in any order to implement the method 70. Additionally, individual steps may be removed or skipped from the method 70 without departing from the spirit and scope of the present disclosure.

At step 72, the method 70 includes mixing a nickel (Ni) salt, the FSZ catalyst, and water to form a first mixture. In some embodiments, the Ni salt includes nickel sulfate, nickel acetate, nickel citrate, nickel iodide, nickel chloride, nickel perchlorate, nickel nitrate, nickel phosphate, nickel triflate, nickel bis(trifluoromethanesulfonyl)imide, nickel tetrafluoroborate, nickel bromide, and/or its hydrate. In a preferred embodiment, the Ni salt is nickel (II) acetate tetrahydrate. The water may be tap water, distilled water, bidistilled water, deionized water, deionized distilled water, reverse osmosis water, and/or some other water. In a preferred embodiment, the water is deionized water. The mixing may be carried out manually or with the help of a stirrer.

At step 74, the method 70 includes drying and calcining the first mixture at a temperature of about 600-800° C., preferably 620-780° C., preferably 640-760° C., preferably 660-740° C., and preferably 680-720° C. Other ranges are also possible. The drying of the first mixture can be done by using heating appliances such as ovens, microwaves, autoclaves, hot plates, heating mantles and tapes, oil baths, salt baths, sand baths, air baths, hot-tube furnaces, and hot-air guns. In a preferred embodiment, the mixture was evaporated and dried. The calcination is carried out by heating it to a high temperature, under a restricted supply of ambient oxygen. This is performed to remove impurities or volatile substances and to incur thermal decomposition. Typically, the calcination is carried out in a furnace, preferably equipped with a temperature control system, which may provide a heating rate of up to 50 degrees Celsius per minute (° C./min), preferably up to 40° C./min, preferably up to 30° C./min, preferably up to 20° C./min, preferably up to 10° C./min, preferably up to 5° C./min. Other ranges are also possible. In a preferred embodiment, the calcination is carried out in a furnace at a heating rate of 10° C./min up to a temperature of 700° C. Other ranges are also possible.

Figure 1C:
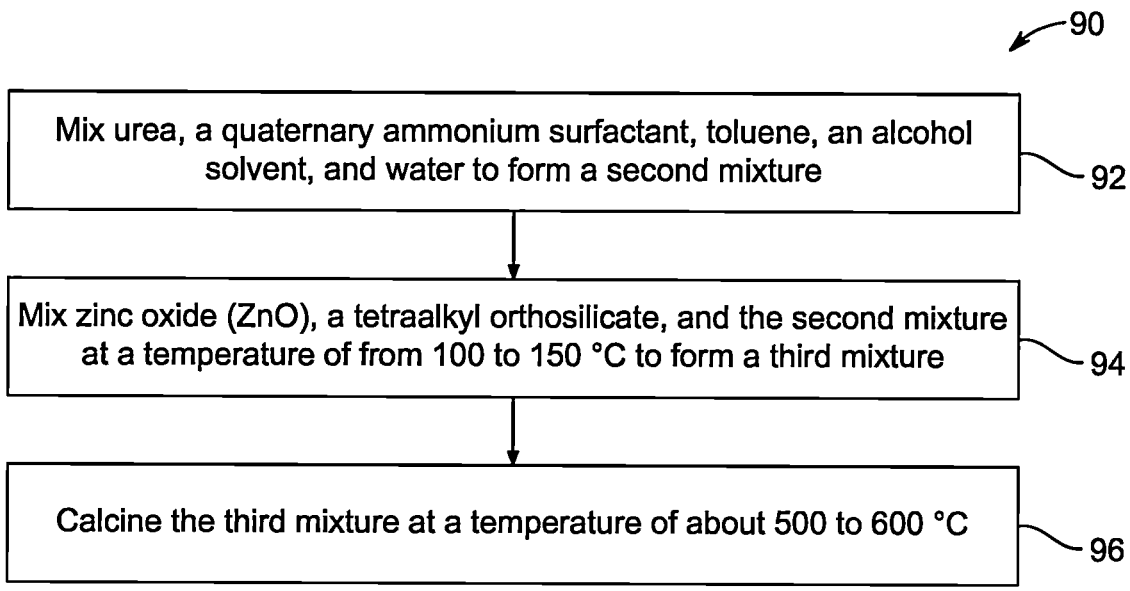
FIG. 1C is a flowchart depicting a method for preparing a fibrous silica zinc oxide (FSZ) catalyst, according to certain embodiments.
Figure 2A:
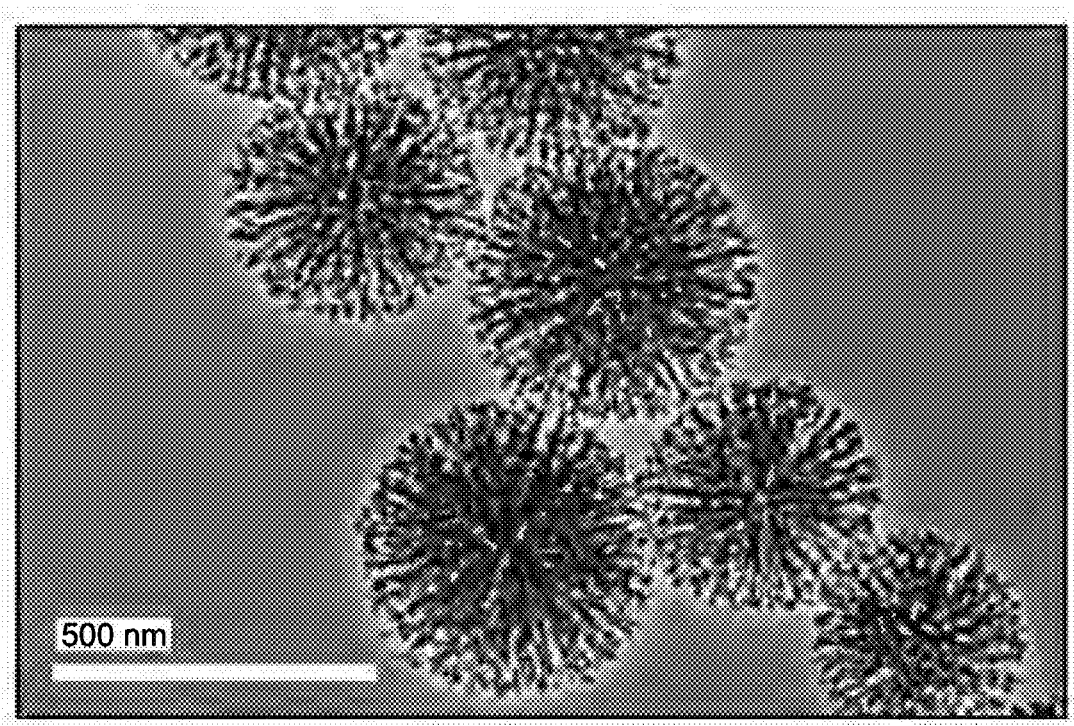
FIG. 2A is a transmission electron microscopic (TEM) image of the FSZ catalyst (FSZ support) with 500 nm magnification, according to certain embodiments.
Figure 2B:
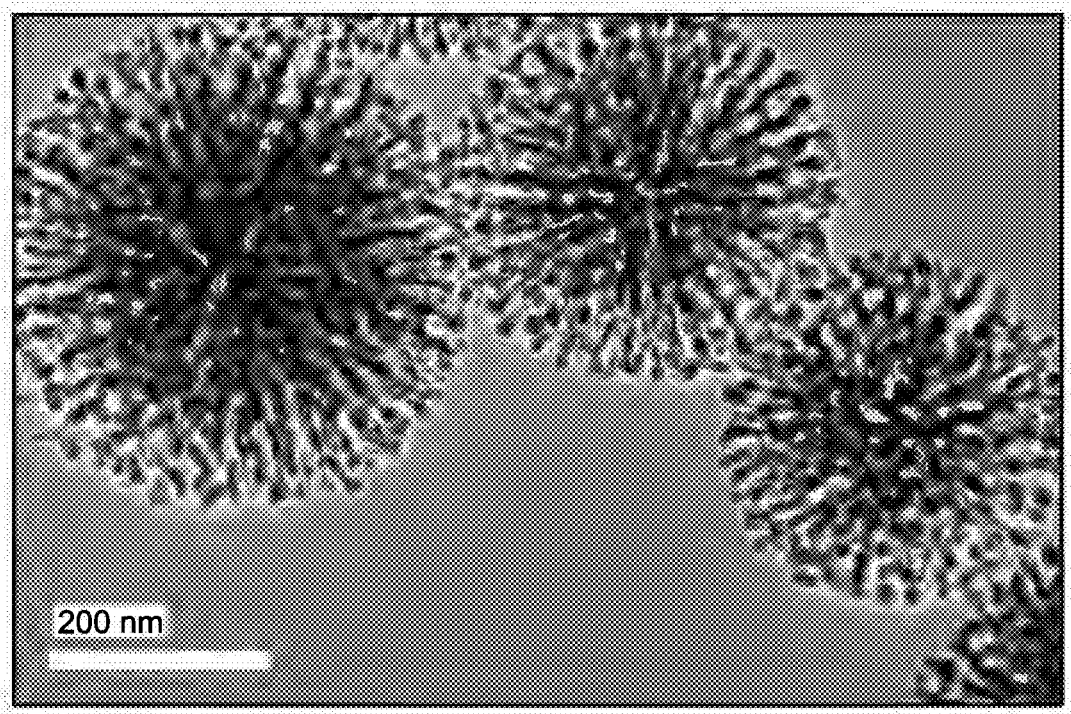
FIG. 2B is a TEM image of the FSZ support with 200 nm magnification, according to certain embodiments.
Figure 2C:
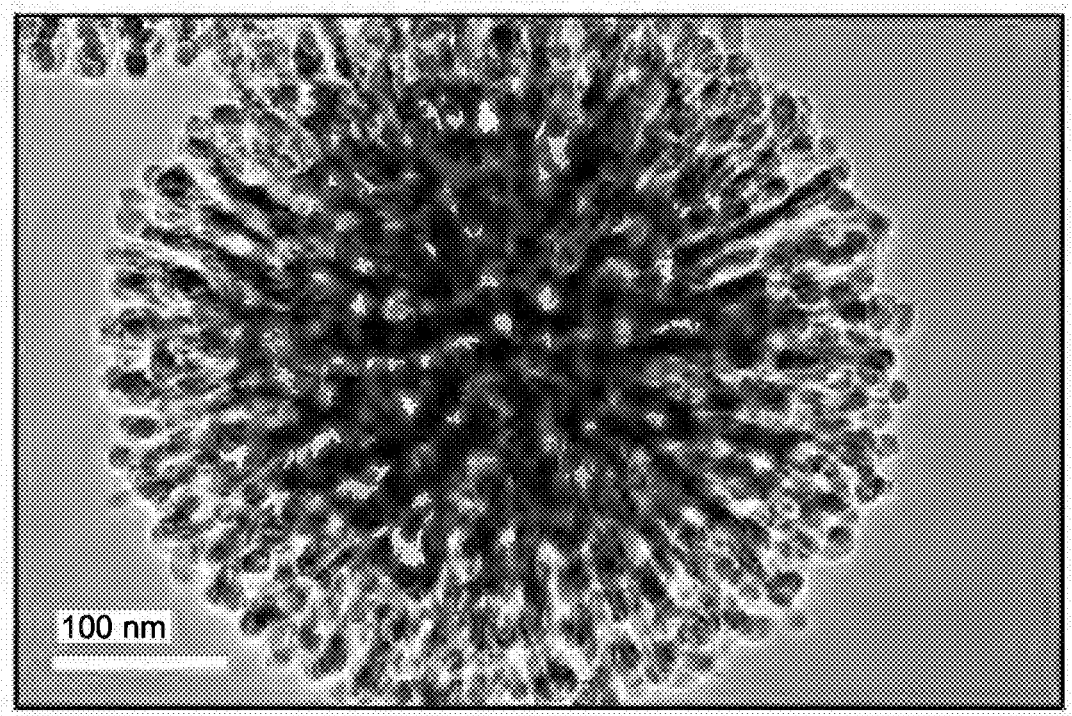
FIG. 2C is a TEM image of the FSZ support with 100 nm magnification, according to certain embodiments.
Figure 2D:
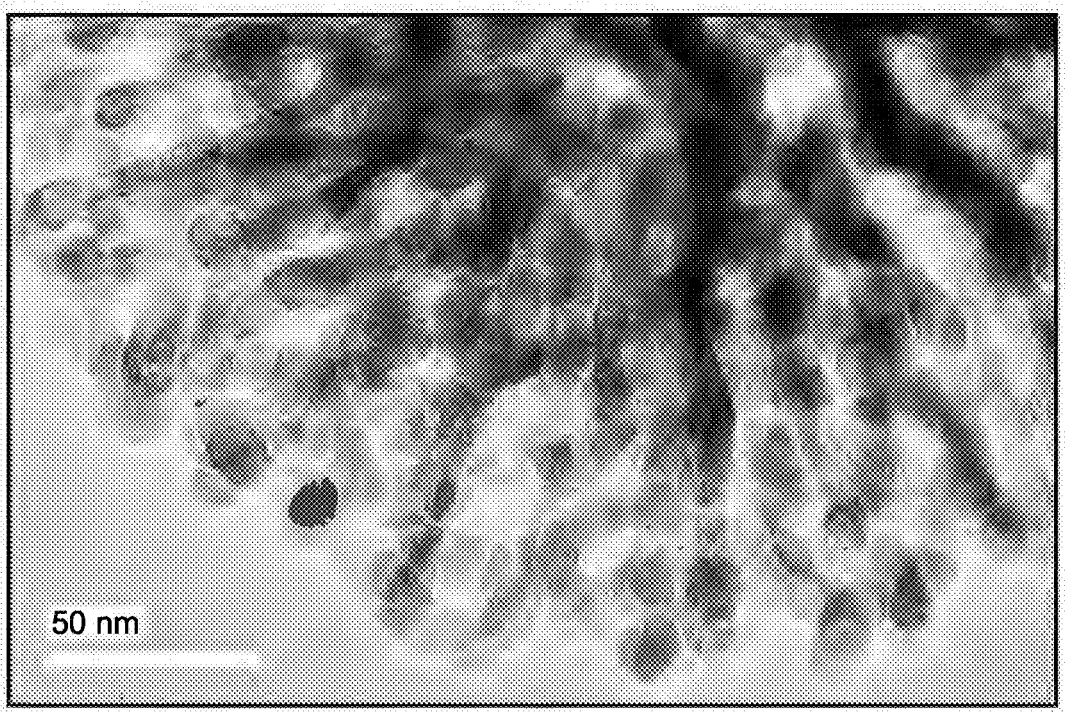
FIG. 2D is a TEM image of the FSZ support with 50 nm magnification, according to certain embodiments.

FIG. 1C illustrates a flow chart of a method 90 for preparing the FSZ catalyst. The order in which the method 90 is described is not intended to be construed as a limitation, and any number of the described method steps can be combined in any order to implement the method 90. Additionally, individual steps may be removed or skipped from the method 90 without departing from the spirit and scope of the present disclosure.

At step 92, the method 90 includes mixing urea, a quaternary ammonium surfactant, toluene, an alcohol solvent, and water to form a second mixture. The weight ratio of urea to quaternary ammonium surfactant is 0.8:1.8, preferably 1:1.7, preferably 1.1:1.6, preferably 1.2:1.5, and preferably 1.3:1.4. Other ranges are also possible. In a preferred embodiment, the weight ratio of urea to quaternary ammonium surfactant is 1:1.67. Other ranges are also possible. The weight ratio of alcohol solvent to toluene is 1:15-1:25, preferably 1:16-1:24, preferably 1:17-1:23, preferably 1:18-1:22, and preferably 1.19-1.21. Other ranges are also possible. In a preferred embodiment, the weight ratio of alcohol solvent to toluene is 1:20.45. Other ranges are also possible.

In some embodiments, the quaternary ammonium surfactant is one or more selected from cetyltrimethylammonium bromide (CTAB), cetyltrimethylammonium chloride (CTACl), tetradecyltrimethylammonium bromide (TTAB), tetradecyltrimethylammonium chloride (TTACl), dodecyltrimethylammonium bromide (DTAB), dodecyltrimethylammonium chloride (DTACl), dodecylethyldimethylammonium bromide (DEDTAB), decyltrimethylammonium bromide (D10TAB), and dodecyltriphenylphosphonium bromide (DTPB). In a preferred embodiment, the quaternary ammonium surfactant is CTAB.

Suitable examples of alcohol solvents include methanol, ethanol, propanol, isopropyl alcohol (IPA), butanol, pentanol, and mixtures thereof. In a preferred embodiment, the alcohol solvent is n-butanol (99%). The water may be tap water, distilled water, bi-distilled water, deionized water, deionized distilled water, reverse osmosis water, and/or some other water. In a preferred embodiment, the water is deionized water. The mixing may be carried out manually or with the help of a stirrer. In some embodiments, the urea is mixed with any quaternary ammonium surfactant, optionally in the presence of a co-surfactant, to form the first mixture.

At step 94, the method 90 includes mixing zinc oxide (ZnO), a tetraalkyl orthosilicate, and the second mixture at a temperature from 100-150° C., preferably 105-145° C., preferably 110-140° C., preferably 115-135° C., and preferably 120-130° C. to form a third mixture. Other ranges are also possible. The tetraalkyl orthosilicate is at least one of tetraethyl orthosilicate (TEOS), tetramethyl orthosilicate, tetrapropyl orthosilicate, and tetrabutyl orthosilicate. In a preferred embodiment, the tetraalkyl orthosilicate is TEOS. The mixing may be carried out manually or with the help of a stirrer. In a preferred embodiment, the mixing is done at a temperature of 120° C. on a stirrer. Other ranges are also possible.

At step 96, the method 90 includes calcining the third mixture at a temperature of about 500-600° C., preferably 510-590° C., preferably 520-580° C., preferably 530-570° C., and preferably 540-560° C. Other ranges are also possible. In a preferred embodiment, the calcining of the third mixture is done at a temperature of 550° C. Other ranges are also possible. The calcination is done in a furnace at a heating rate of up to 50° C./min, preferably up to 40° C./min, preferably up to 30° C./min, preferably up to 20° C./min, preferably up to 10° C./min, preferably up to 5° C./min. Other ranges are also possible. In a preferred embodiment, the calcination is carried out in a furnace at a heating rate of 10° C./min. Other ranges are also possible.

EXAMPLES

The following examples demonstrate a method for dry reforming of methane (DRM) using a fibrous silica zinc oxide-supported nickel catalyst. The examples are provided solely for illustration and are not to be construed as limitations of the present disclosure, as many variations thereof are possible without departing from the spirit and scope of the present disclosure.

Example 1: Chemicals

All the chemicals were applied without any further modification and were of analytical grade. Zinc oxide (ZnO), urea, cetyltrimethylammonium bromide (CTAB), and tetraethyl orthosilicate (TEOS; 99%) were purchased from Sigma Aldrich. Toluene (99.9%) is procured from Honeywell, and n-butanol (99%) is purchased from Fluka Chemika. All experiments were conducted with deionized water (DI $H_2O$).

Example 2: Synthesis of Catalyst

ZnO was used to create fibrous silica zinc oxide (FSZ). FSZ was created by combining the crystallization of the zinc oxide seed with the microemulsion process. To aid in the formation and stabilization of micelles, the hydrolyzing agent (urea), the surfactant (CTAB), the oil phase (toluene), and the co-surfactant (n-butanol) were utilized in the synthesis process. A solution was prepared by dissolving about 5.82 grams (g) of CTAB and about 3.48 g of urea in about 173 milliliters (mL) of distilled water. After that, the solution was mixed for 30 min (min) at 25 degrees Celsius (° C.) with the addition of n-butanol and toluene in the quantity of about 8.5 mL and about 173.9 mL, respectively. After adding about 1.6 g of commercial zinc oxide seeds, the solution was placed into a 500 mL bottle, and about 12.7 mL TEOS was added to the solution while stirring for about 10 minutes (min). The solution was stirred for 6 hours (h) before being kept at about 120° C. for about 8 h. The mixture was washed with ethanol and centrifuged at about 4000 revolutions per minute (rpm) before being dried for about 12 h over about 120° C. Afterward, the specimen was heated to about 550° C. in the atmosphere for about 6 h. Using a wet impregnation procedure, Nickel (II) acetate tetrahydrate was used to load metal onto FSZ by dissolving it in a deionized form. The catalysts were evaporated and dried before impregnation, and they were calcined for about 150 min at about 700° C. This procedure resulted in the powder that was Ni/FSZ-tagged.

Example 3: Catalytic Reaction

A DRM reaction was carried out in a fixed-bed reactor heated in a furnace supplied with a programmable temperature controller at atmospheric pressure to investigate the effects of surface morphology, stability, and catalyst activity. Typically, after being positioned in the middle of the reactor, about 0.2 g of freshly synthesized catalysts with particle sizes ranging from 300 to 500 micrometers (μm) were loaded onto quartz wool. The catalyst was activated before the reaction for about 2 h at about 700° C. under a combination of argon and about 10 vol % hydrogen gas flowing at about 20 milliliters per minute (mL/min). After the reduction, the reactor was cooled to the reaction temperature. Then, a mixture of carbon dioxide ($CO_2$) and methane ($CH_4$) was flowed in a 1:1 ratio at a flow rate of about 20 mL/min to analyze the catalytic activity. The reactor's temperature was programmed to rise from 500 to 1000° C. with a 50° C. interval. An online gas chromatograph (6890 N Agilent GC) with a thermal conductivity detector (TCD) was used to analyze the gas for both the reactants and the products. The following calculations were applied to calculate the conversion of $CO_2$ and $CH_4$, the yield of hydrogen ($H_2$) and carbon monoxide (CO) products, and the ratio of $H_2/CO$. To calculate the conversion of $CO_2$ and $CH_4$, the yield of $H_2$ and CO products, and the ratio of $H_2/CO$, the following calculations were applied, $$CH_4 \text{ Conversion} = \frac{F_{(CH_4)in} - F_{(CH_4)out}}{F_{(CH_4)in}} \times 100$$

-continued $$CO_2 \text{ Conversion} = \frac{F_{(CO_2)in} - F_{(CO_2)out}}{F_{(CO_2)in}} \times 100$$

$$H_2 \text{ Yield} = \frac{F_{(H_2)out}}{2[F_{(CH_4)in}]} \times 100$$

$$CO \text{ Yield} = \frac{F_{(CO)out}}{[F_{(CO_2)in} + F_{(CO_2)out}]} \times 100$$

$$H_2/CO = \frac{F_{(H_2)out}}{F_{(CO)out}}$$

where $F_{(out)}$ denotes the outflow rate and $F_{(in)}$ in the inlet flow rate.

Example 4: Morphological Properties

The morphological properties of Ni/FSZ were characterized by Scanning electron microscopy (SEM) and transmission electron microscopy (TEM). The results of TEM revealed intricate details of FSZ catalyst supports with varying particle sizes. FIGS. 2A-2D shows TEM images of the FSZ support at 500 nm, 200 nm, 100 nm, and 50 nm magnification, respectively. At 500 nanometers (nm), the TEM images showcased the presence of a rounded-shaped nanosphere-like to cockscomb-like structure of well-order fiber morphology. As the size decreased, a noticeable evolution in particle morphology became evident, with a shift towards a more agglomerated structure. The FSZ had a spherical bi-continuous concentric lamellar form surrounded by a large layer of substantial layer of silica fibers on the outer surface. Overall, the TEM images showed the structural changes of the FSZ support at different scales, contributing to its performance in the DRM.

Figure 3A:
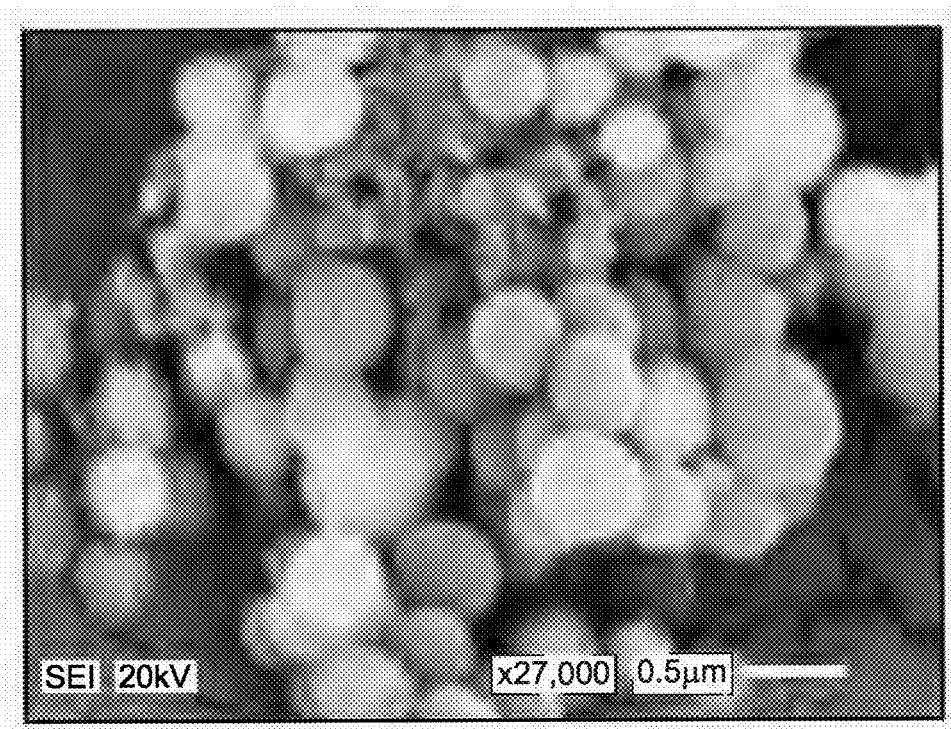
FIG. 3A is a scanning electron microscopic (SEM) image of the FSZ support with 0.5 μm magnification, according to certain embodiments.
Figure 3B:
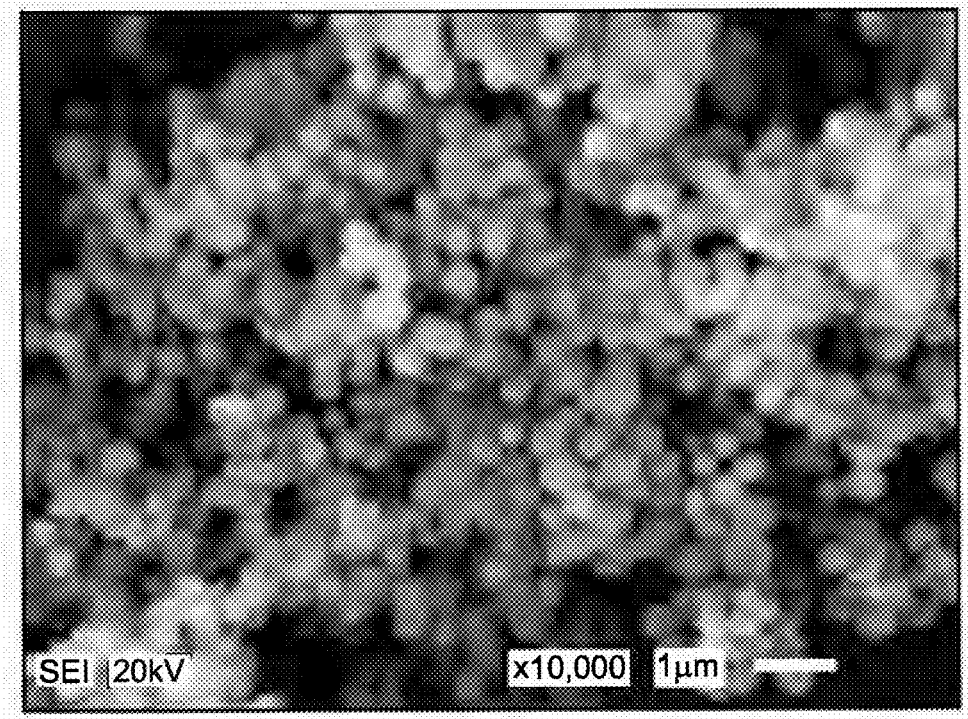
FIG. 3B is a SEM image of the FSZ support with 1 μm magnification, according to certain embodiments.
Figure 3C:
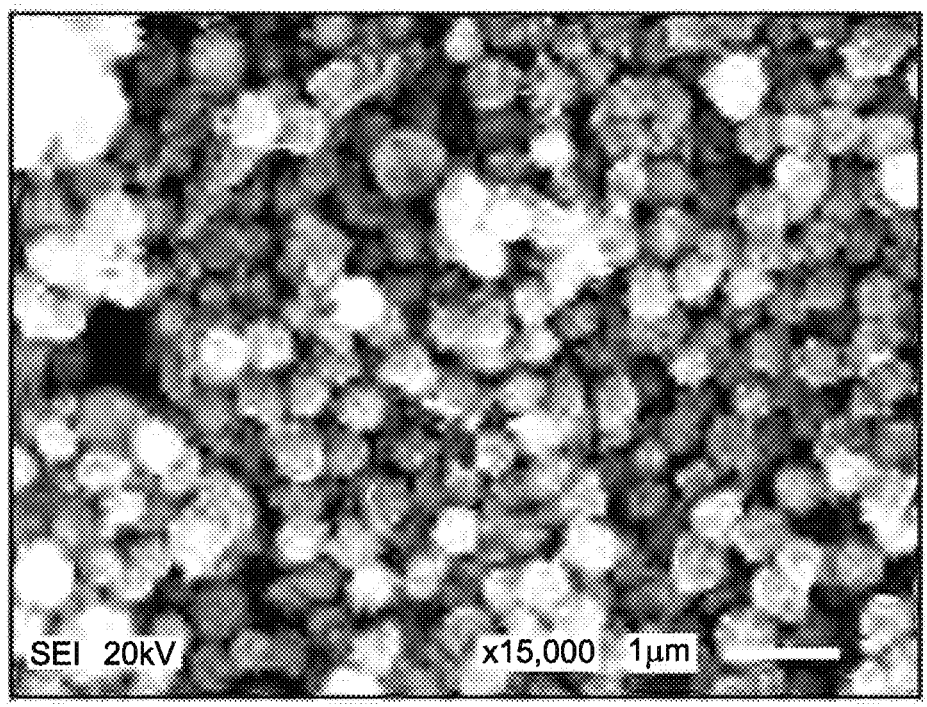
FIG. 3C is a SEM image of the Ni/FSZ catalyst with 1 μm magnification, according to certain embodiments.
Figure 3D:
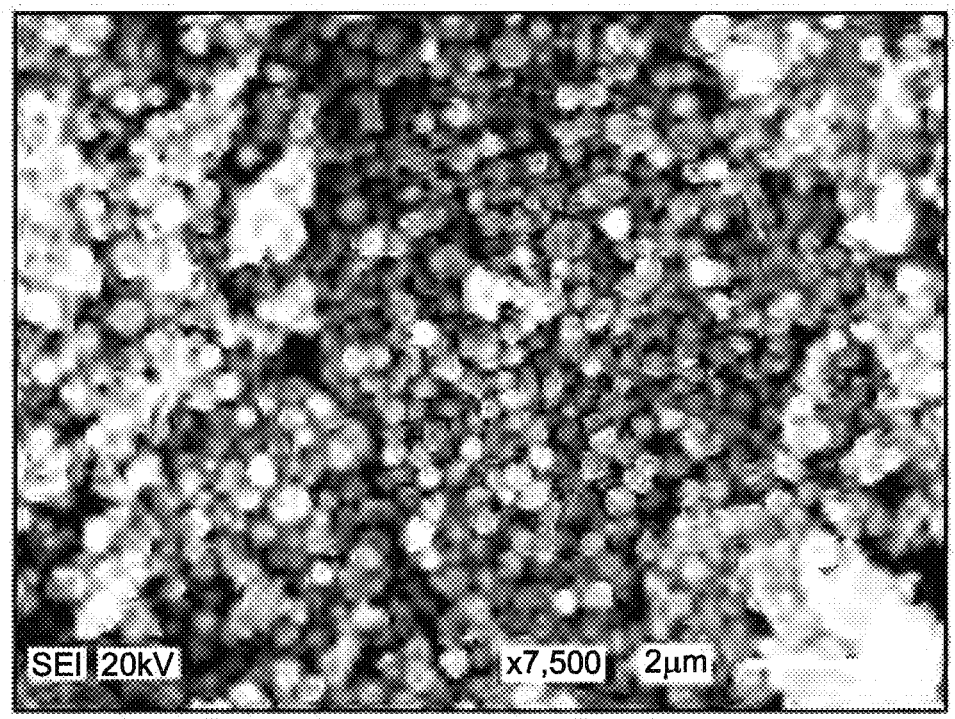
FIG. 3D is a SEM image of the Ni/FSZ catalyst with 2 μm magnification, according to certain embodiments.

FIGS. 3A-3B shows SEM images of the FSZ support with 0.5 μm and 1 μm magnification, respectively. SEM images of the FSZ support with varying sizes of particles revealed different surface characteristics and microstructure of the formed nanosphere. At 0.5 μm, the support exhibited a fine and uniform texture, with visible inter-fiber gaps and irregularities. The 1 μm particles displayed a slightly coarser structure, showing interconnected fibrous networks that allowed for enhanced surface area. FIGS. 3C-3D show SEM images of the Ni/FSZ catalyst with 1 μm and 2 μm magnification. The 1 μm particles of Ni/FSZ displayed more pronounced Ni particles over FSZ, with filling the visible inter-fiber gaps of FSZ support. Similarly, the 2 μm particles of Ni/FSZ showed more irregularities of the spheres holding more amount of Ni over the surface of FSZ support. These SEM images provided insights into the morphological variations of the FSZ support, influencing its catalytic performance in DRM, a procedure necessary for $CO_2$ mitigation and syngas production.

Figure 4A:
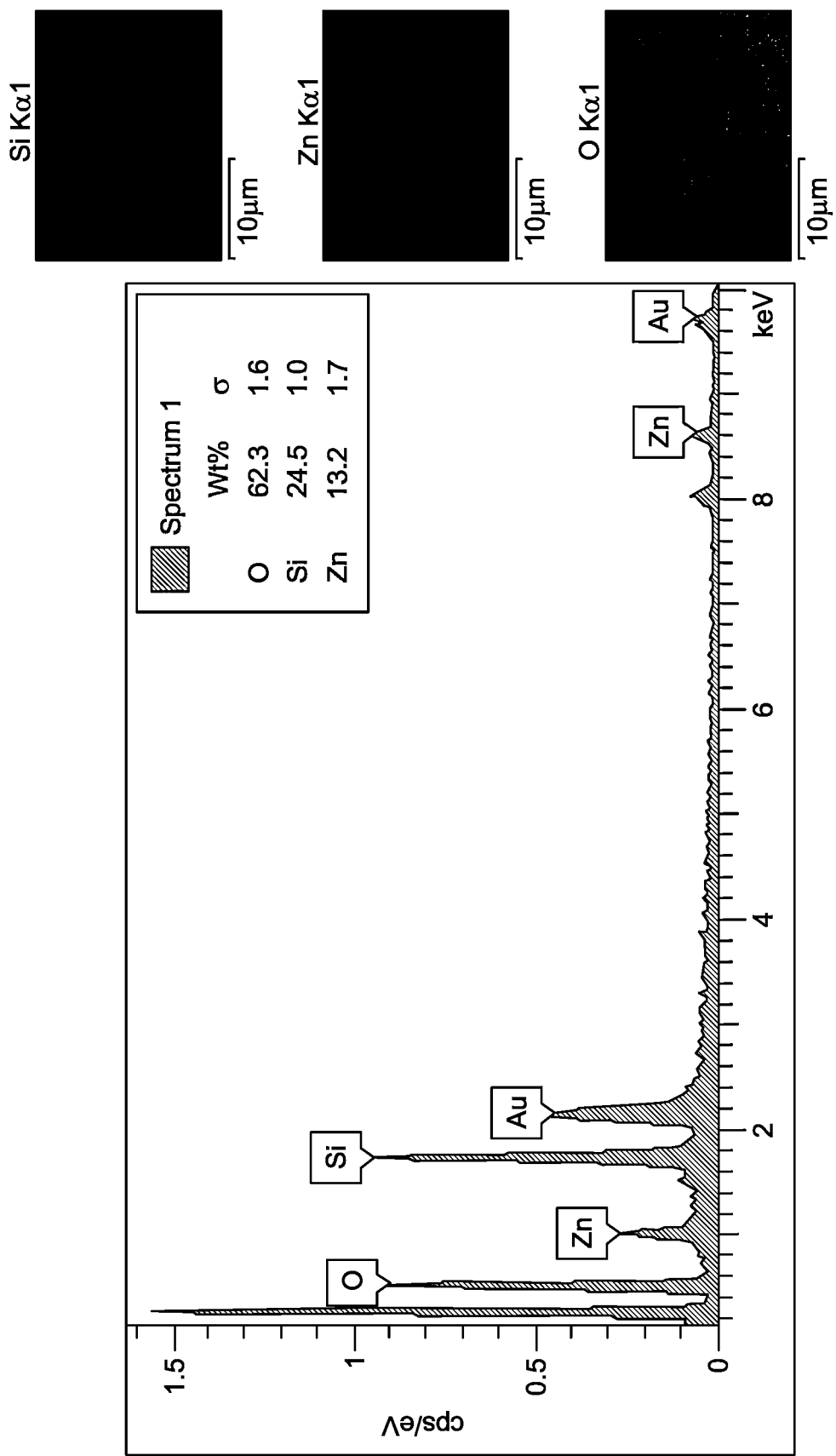
FIG. 4A shows an energy dispersive X-ray spectroscopic (EDS) analysis of the FSZ support depicting the elemental composition of the FSZ support, according to certain embodiments.
Figure 4B:
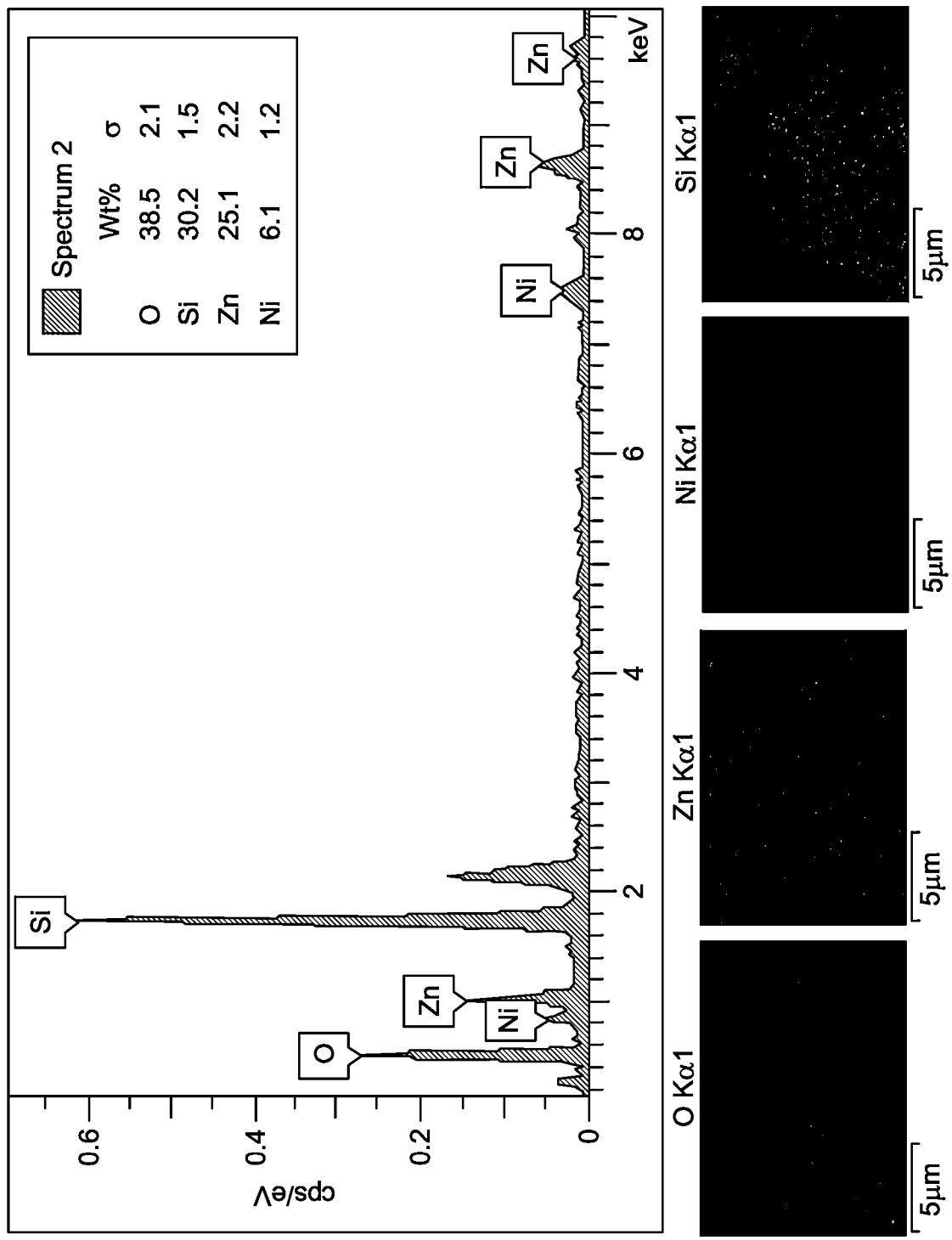
FIG. 4B shows an EDS analysis of the Ni/FSZ catalyst depicting the elemental composition of the Ni/FSZ catalyst, according to certain embodiments.

FIG. 4A shows an Energy-dispersive X-ray spectroscopy (EDS) analysis of the FSZ support and FIG. 4B shows EDS analysis of Ni/FSZ catalyst to determine elemental compositions and distribution patterns. The combination of EDS and SEM images showcased the elemental makeup of the FSZ support and Ni/FSZ catalyst. Nickel (Ni) nanoparticles were evident on the FSZ surface, with varying densities corresponding to the particle sizes of 2 μm, 1 μm, and 0.5 μm. The EDS spectra confirmed the presence of zinc (Zn), silicon (Si), and oxygen (O), constituting the base support material, while the nickel signal indicated the catalyst's incorporation as presented in FIG. 4B. This result shows the distribution of active catalytic components on the support's surface, enhancing the Ni/FSZ catalyst's potential for efficient DRM applications.

Example 5: Structural Characteristics

X-ray diffraction (XRD) was performed on the Ni/FSZ containing varying Ni loadings amount of 3, 5, 10, and 15% as shown in FIG. 5. The obtained X-ray diffraction patterns exhibited distinct peaks at specific diffraction angles, indicative of crystalline phases present in the material. The identified peaks at 21.8°, 25.4°, 31.7°, 33.9°, 34.3°, 36.1°, 37.7°, 43.2°, 47.4°, 48.8°, 62.7°, 65.3°, and 66.3° corresponded to different crystal planes within the sample. These peaks indicated the presence of diverse crystalline structures, possibly related to Ni compounds and the fibrous silica zinc oxide support. The intensity and position of these peaks varied with the Ni content, showing changes in the material's crystalline phases and possibly the dispersion of Ni nanoparticles. This XRD analysis provided essential information about the structural characteristics of the Ni/FSZ support at different Ni loadings, contributing to its suitability for DRM reaction. As a result of the formation of silica fibers on ZnO, the crystallinity of the FSZ has been reduced (See: M. L. Firmansyah et al., "Synthesis and characterization of fibrous silica ZSM-5 for cumene hydrocracking," Catal Sci Technol, vol. 6, no. 13, pp. 5178-5182, 2016, S. M. Izan et al., "Additional Lewis acid sites of protonated fibrous silica@BEA zeolite (HSi@BEA) improving the generation of protonic acid sites in the isomerization of C6 alkane and cycloalkanes," Appl Catal A Gen, vol. 570, pp. 228-237, January 2019, each of which is incorporated herein by reference in their entireties).

Figure 6:
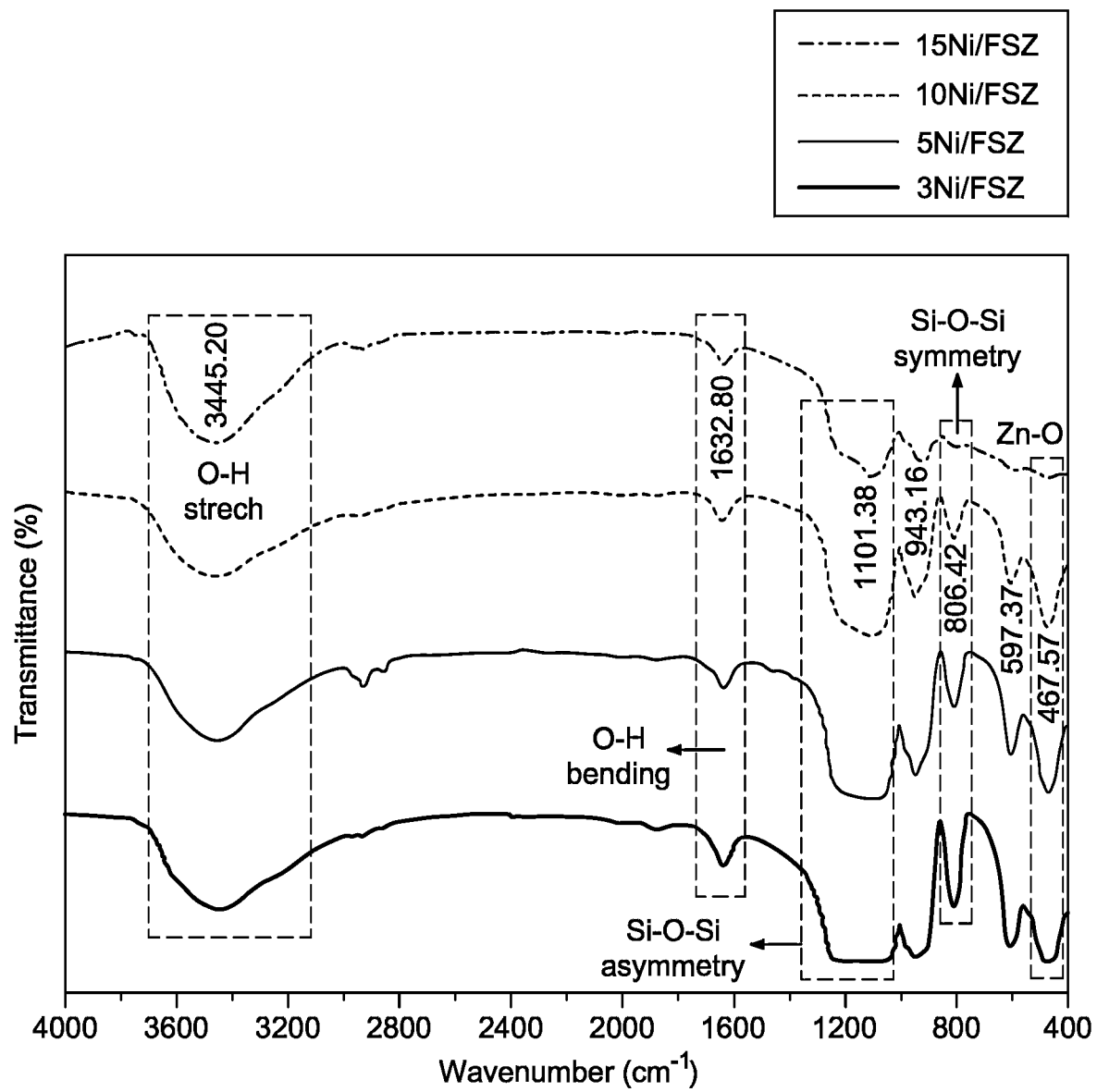
FIG. 6 depicts a Fourier-transform infrared (FTIR) spectroscopic analysis of the Ni/FSZ catalyst with nickel loading 3%, 5%, 10%, and 15% to determine crystallinity and structure, according to certain embodiments.

Fourier-transform infrared (FTIR) spectroscopic analysis of Ni/FSZ catalysts is shown in FIG. 6. FTIR was carried out on a series of samples, including FSZ and Ni/FSZ catalysts with varying Ni loadings of 3%, 5%, 10%, and 15%, to investigate their molecular compositions and surface functionalities for DRM. The FTIR spectra exhibited distinctive absorption bands showing the chemical bonds and species present. In the FSZ sample, characteristic peaks were observed at wavenumbers of 1101.38, 806.42, and 467.57 $cm^{-1}$, indicating the presence of silica (Si—O—Si) and zinc oxide (Zn—O) bonds, respectively. As Ni content increased in the Ni/FSZ samples, shifts, and changes in the intensity of certain peaks were noticeable, showing interactions between the Ni species and the support material. Additional absorption bands related to Ni species and potential interactions between Ni and surface oxygen species might have emerged. These spectral variations show the surface modifications induced by introducing Ni, potentially affecting the catalytic activity for DRM reaction. The FTIR analysis shows the molecular changes and interactions occurring within the Ni/FSZ catalysts with varying Ni loadings, indicating their chemical behavior and catalytic applications.

Example 6: Textural Characteristics

Figure 7A:
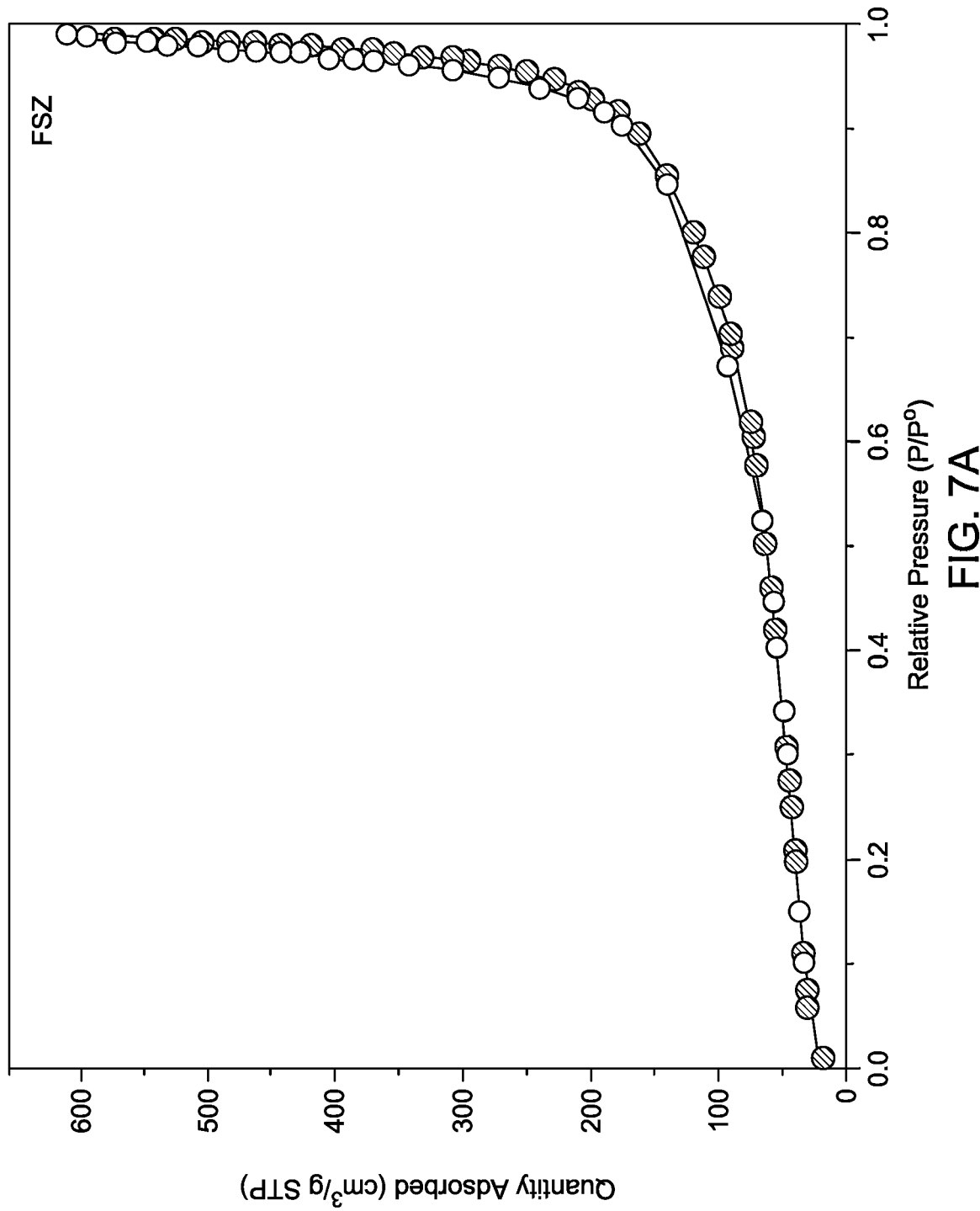
FIG. 7A shows a Brunauer-Emmett-Teller (BET) surface area analysis of the FSZ support, according to certain embodiments.
Figure 7B:
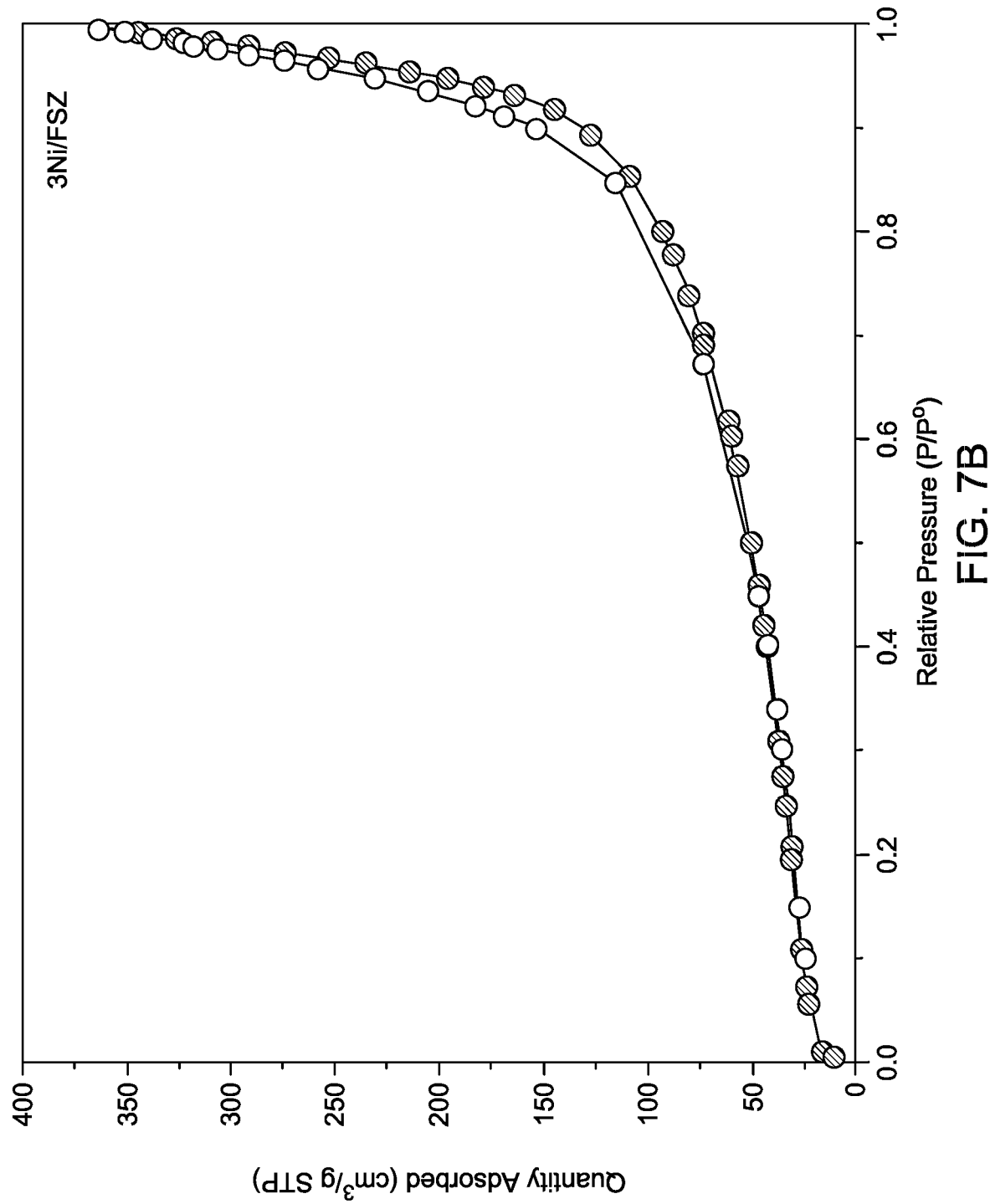
FIG. 7B shows a BET surface area analysis of the Ni/FSZ catalyst with 3% nickel loading, according to certain embodiments.
Figure 7C:
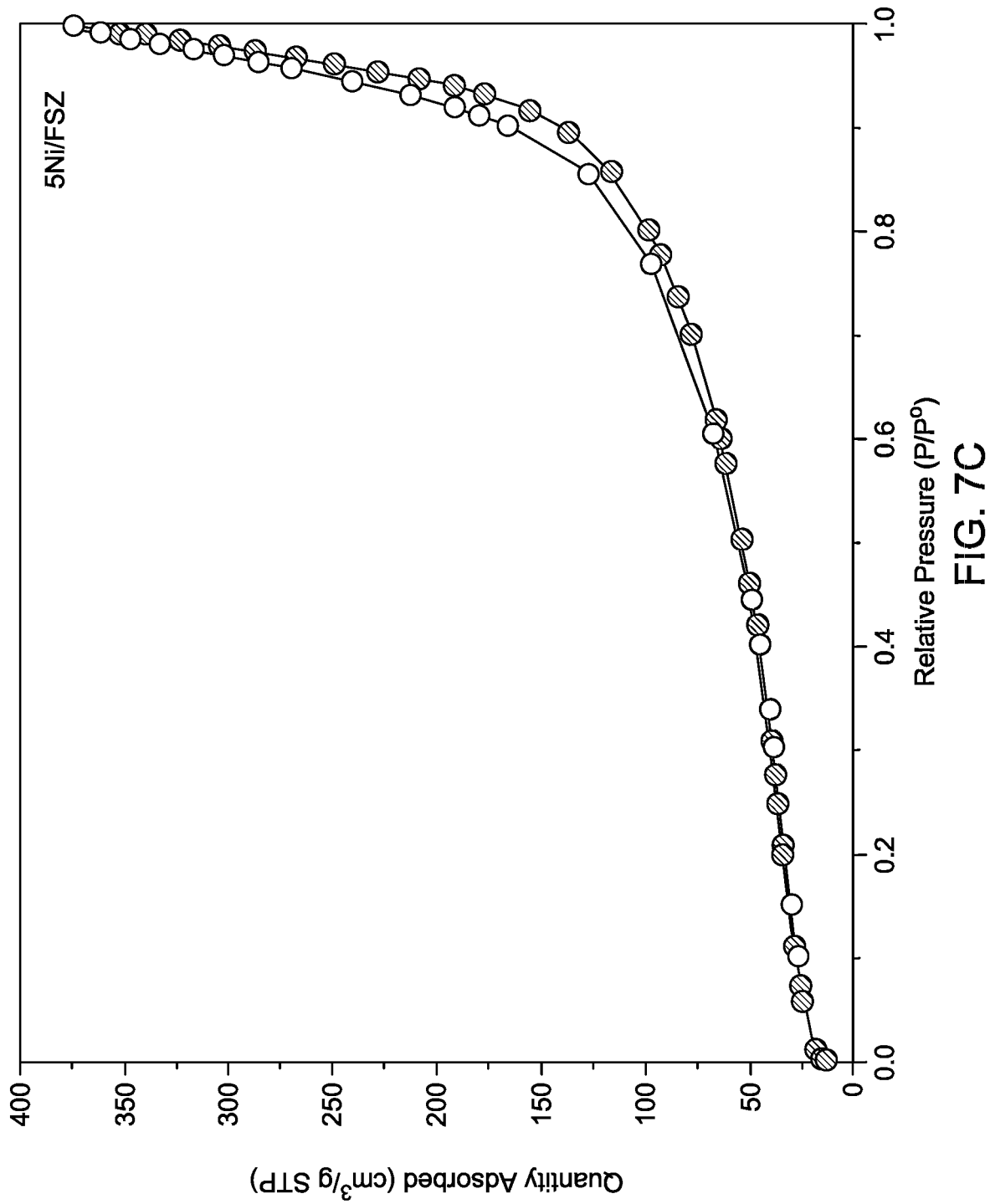
FIG. 7C shows a BET surface area analysis of the Ni/FSZ catalyst with 5% nickel loading, according to certain embodiments.
Figure 7D:
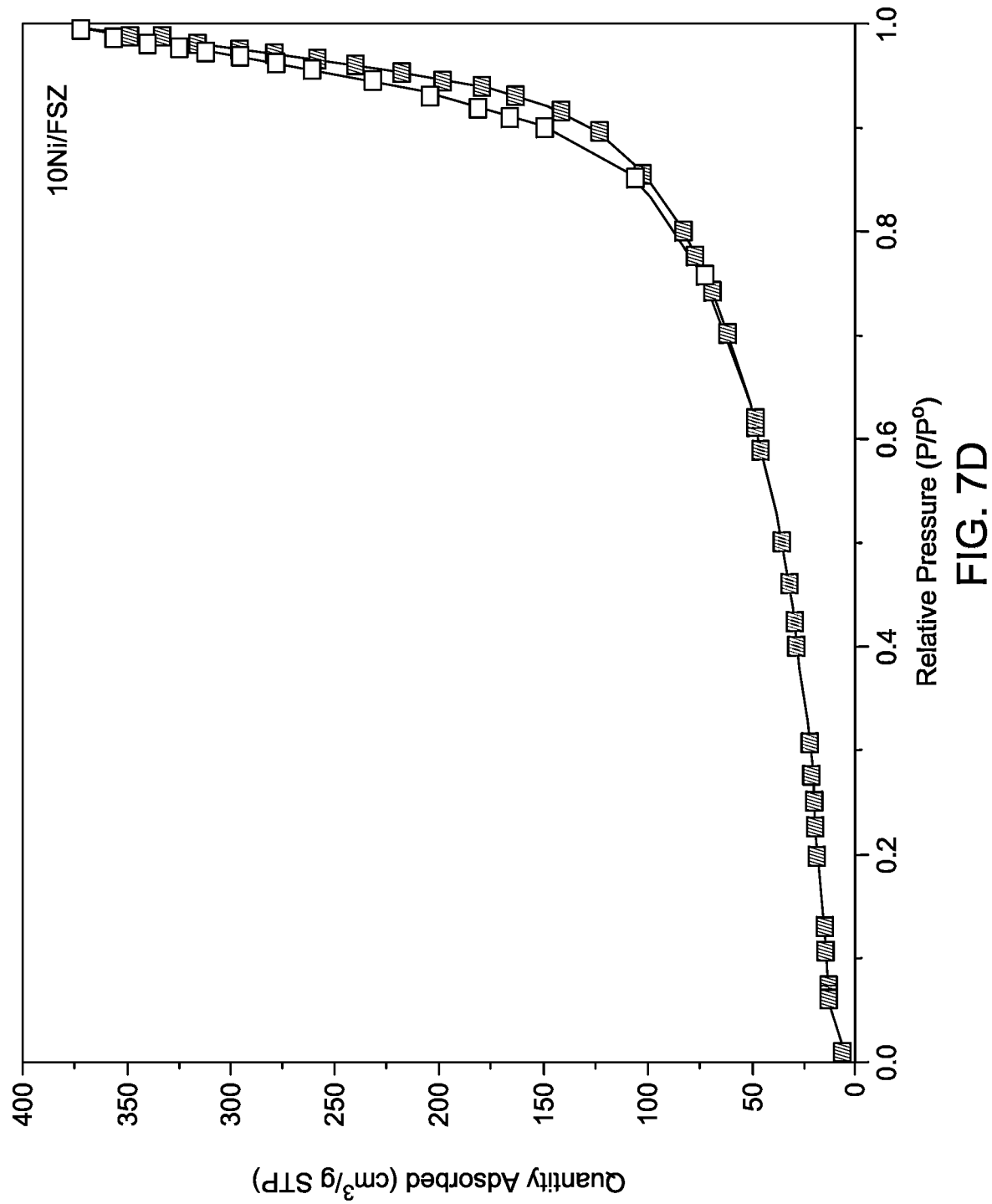
FIG. 7D shows a BET surface area analysis of the Ni/FSZ catalyst with 10% nickel loading, according to certain embodiments.
Figure 7E:
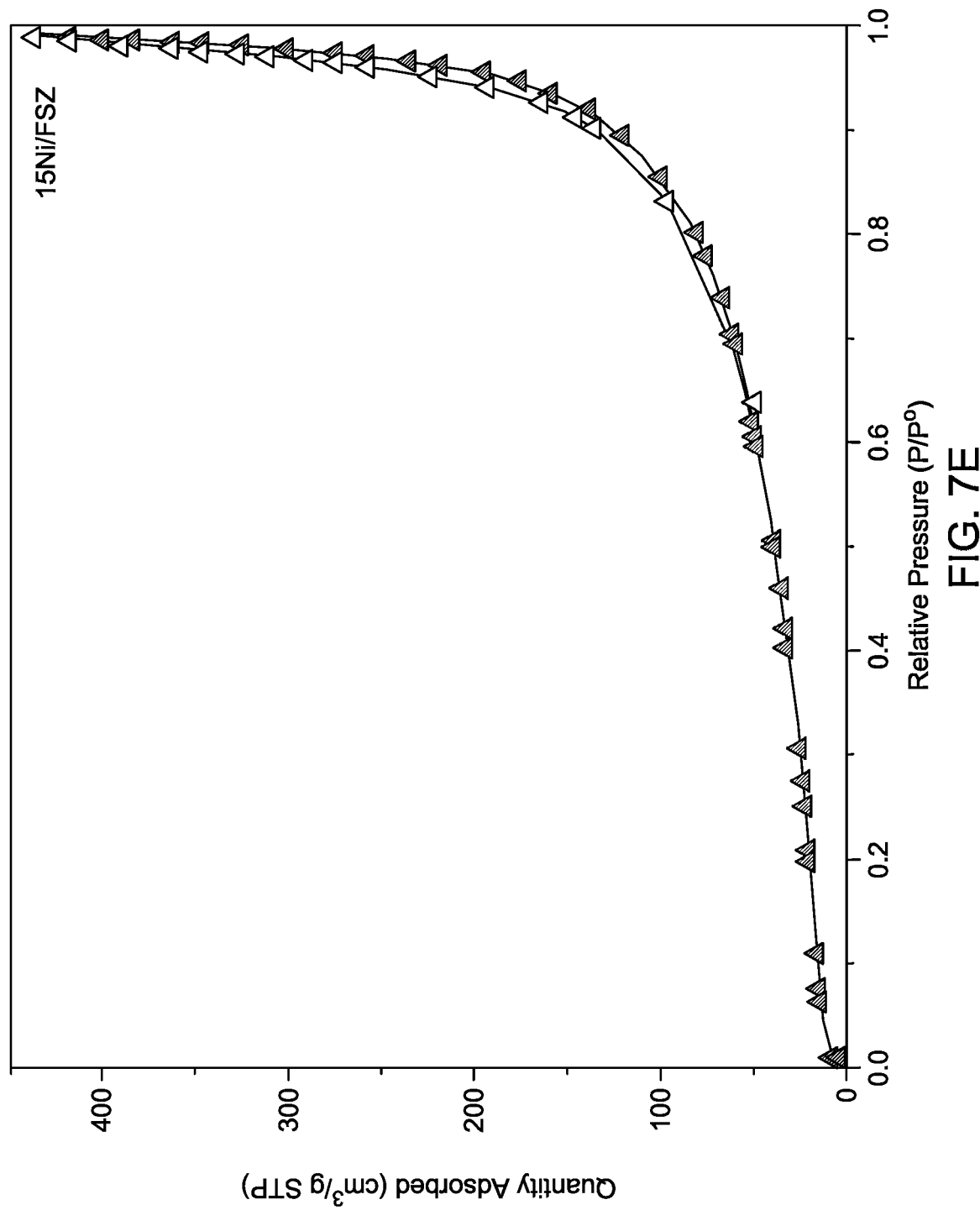
FIG. 7E shows a BET surface area analysis of the Ni/FSZ catalyst with 15% nickel loading, according to certain embodiments.
Figure 8A:
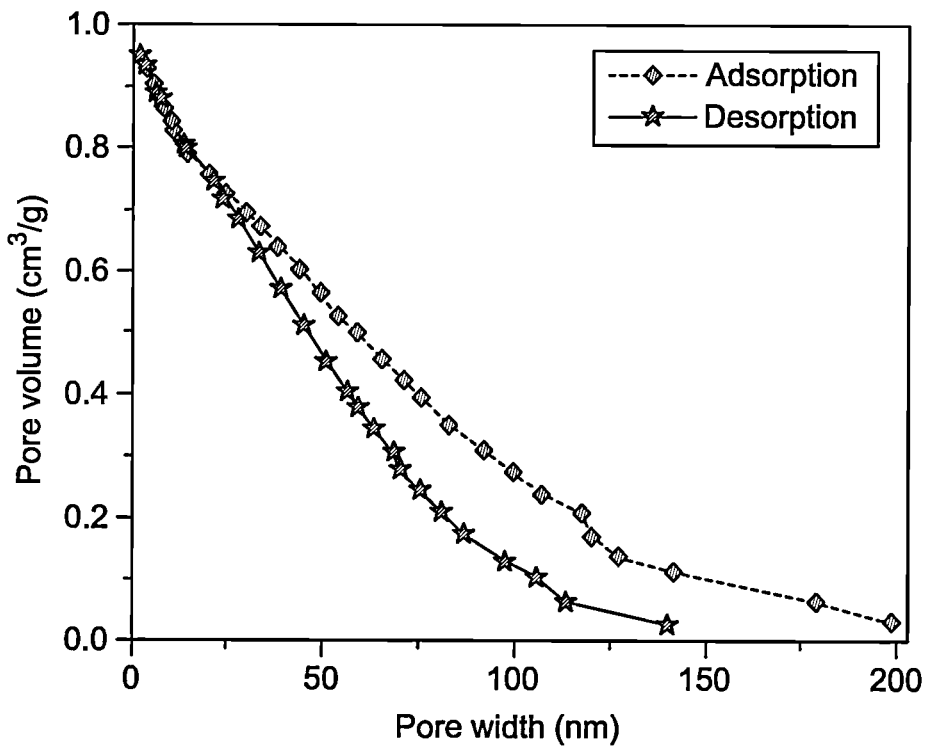
FIG. 8A is a plotted graph depicting pore width versus pore volume of the FSZ support, according to certain embodiments.
Figure 8B:
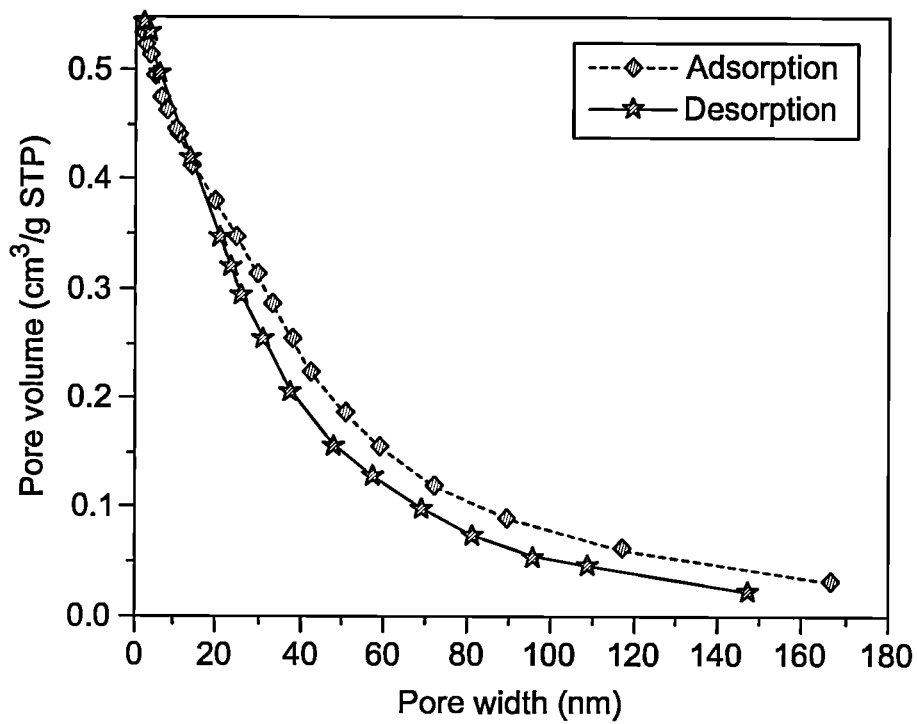
FIG. 8B is a plotted graph depicting pore width versus pore volume of the Ni/FSZ catalyst with 3% nickel loading, according to certain embodiments.
Figure 8C:
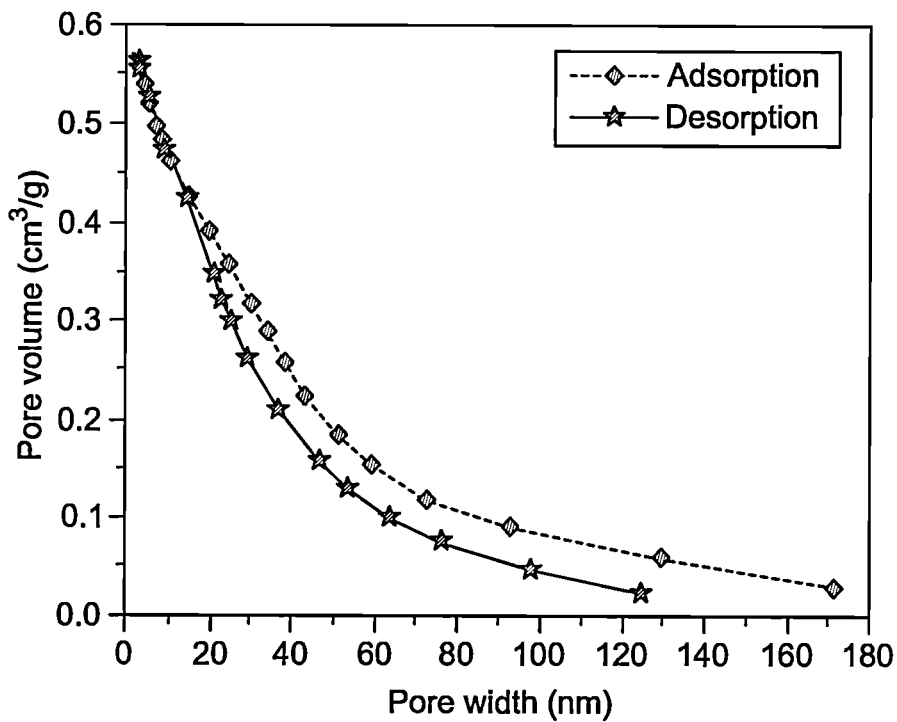
FIG. 8C is a plotted graph depicting pore width versus pore volume of the Ni/FSZ catalyst with 5% nickel loading, according to certain embodiments.
Figure 8D:
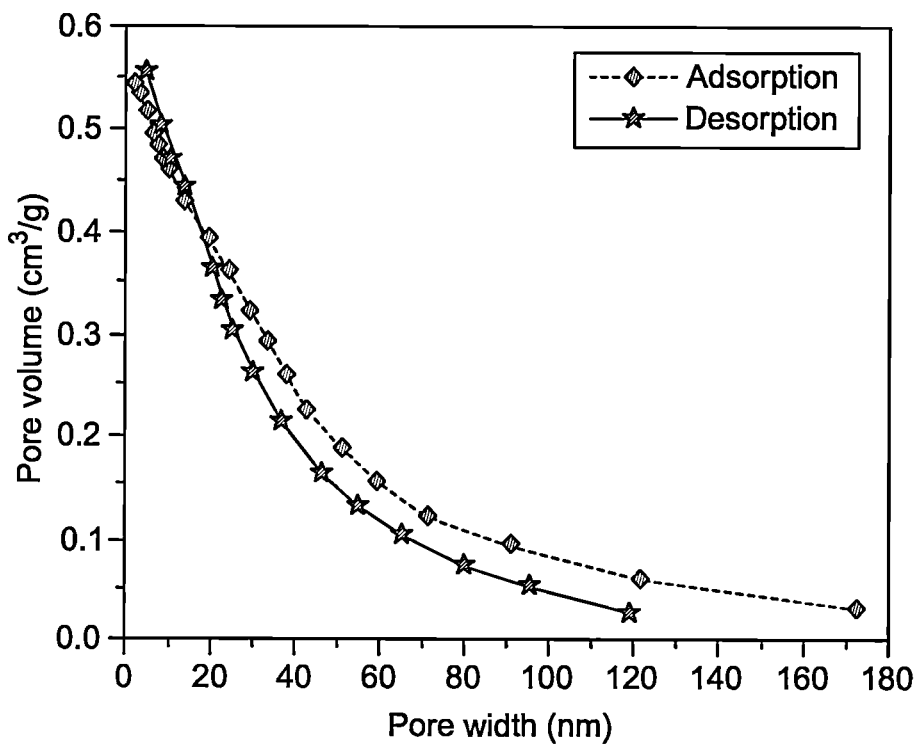
FIG. 8D is a plotted graph depicting pore width versus pore volume of the Ni/FSZ catalyst with 10% nickel loading, according to certain embodiments.
Figure 8E:
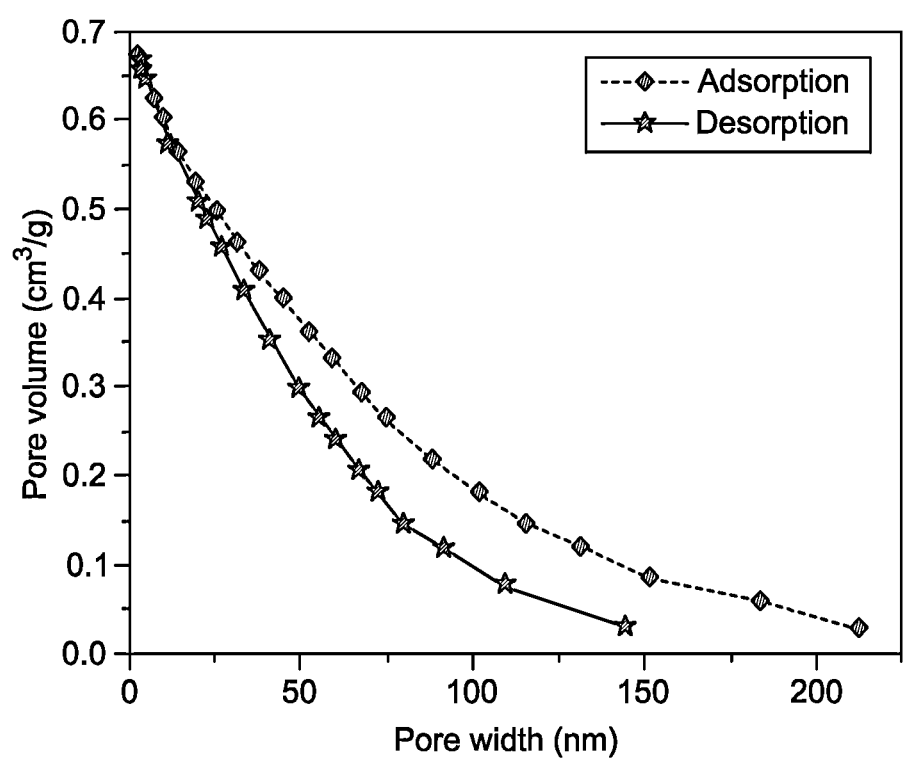
FIG. 8E is a plotted graph depicting pore width versus pore volume of the Ni/FSZ catalyst with 15% nickel loading, according to certain embodiments.

Brunauer-Emmett-Teller (BET) surface area analysis was conducted on a series of catalyst samples comprising FSZ and varying Ni loadings of 3%, 5%, 10%, and 15% Ni/FSZ for their use in the DRM. FIG. 7A shows BET surface area analysis, while FIG. 8A shows the plot of pore width versus pore volume of the FSZ support. FIGS. 7B-7E shows BET surface area analysis, while FIGS. 8B-8E shows the plot of pore width versus pore volume of the Ni/FSZ catalysts with Ni loadings of 3%, 5%, 10%, and 15%, respectively. The analysis shows the pore characteristics and specific surface area of these catalysts. The nitrogen adsorption isotherms showed distinctive trends based on the volume of pores and surface area across the different Ni loadings. The FSZ support exhibited a relatively large specific surface area, with well-defined mesopores contributing to its porous structure. As the Ni loading increased, there was an impact on the catalyst's surface properties. The addition of Ni nanoparticles reduced pore volume and specific surface area, which may be related to the presence of active catalytic sites over the support's surface. These changes showed that Ni species have been effectively incorporated into the FSZ matrix. The BET analysis results showed the catalysts' textural characteristics, offering crucial information about their potential for promoting DRM reaction through surface area and pore structure modifications.

TABLE 1

BET surface area analysis results.

| Catalysts | Surface area (m²/g) | Pore volume (cm³/g) | Average pore size (nm) |
|---|---|---|---|
| FSZ | 147.79 | 0.36798 | 9.9593 |
| 3Ni/FSZ | 112.79 | 0.31479 | 11.1633 |
| 5Ni/FSZ | 122.52 | 0.33981 | 11.0940 |
| 10Ni/FSZ | 66.64 | 0.31859 | 19.1245 |
| 15Ni/FSZ | 76.42 | 0.28209 | 14.7655 |

Example 7: Catalytic Activity

Figure 9A:
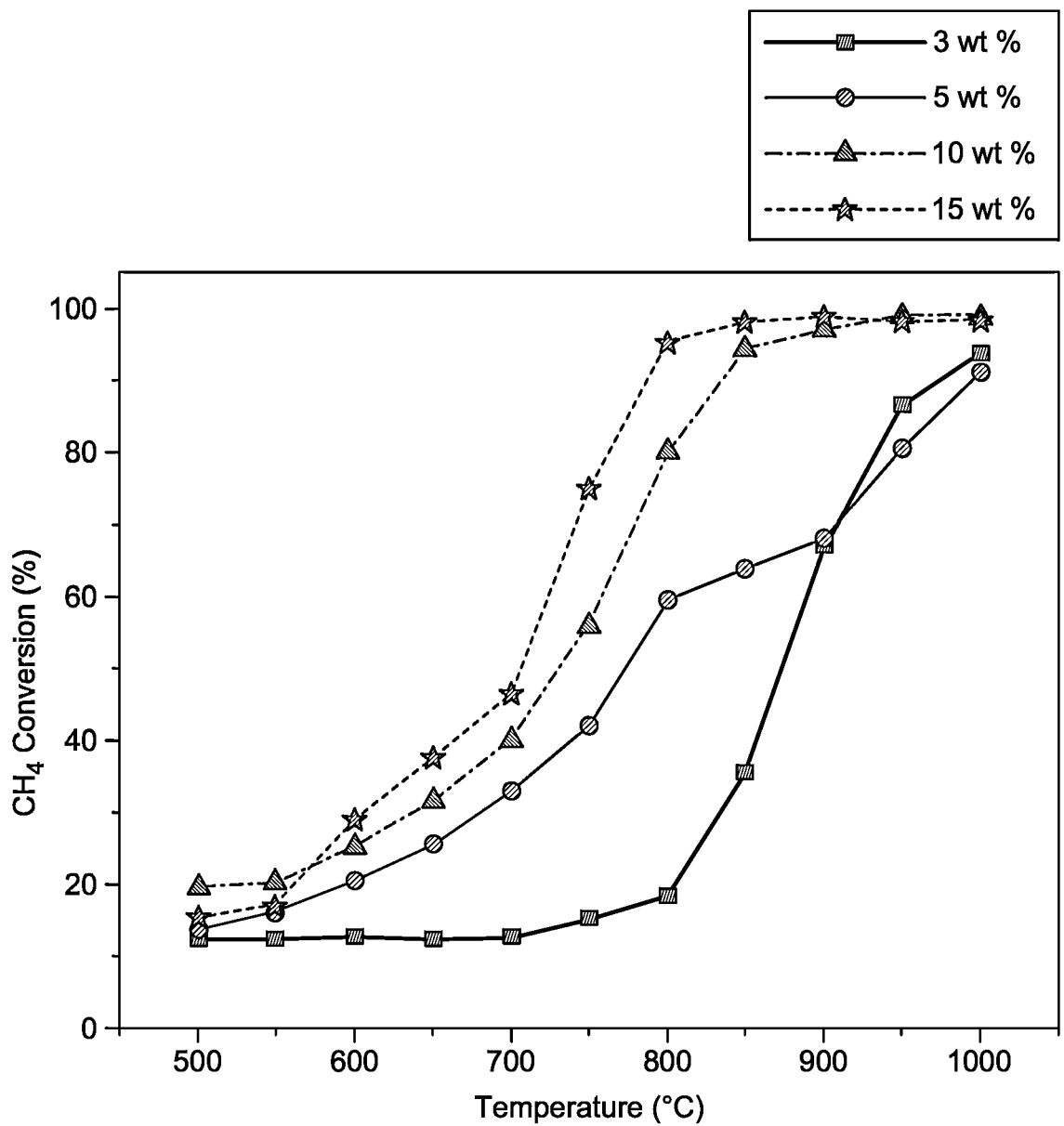
FIG. 9A is a plotted graph depicting the effect of temperature on percentage conversion of methane ($CH_4$) with the Ni/FSZ catalyst, according to certain embodiments.
Figure 9B:
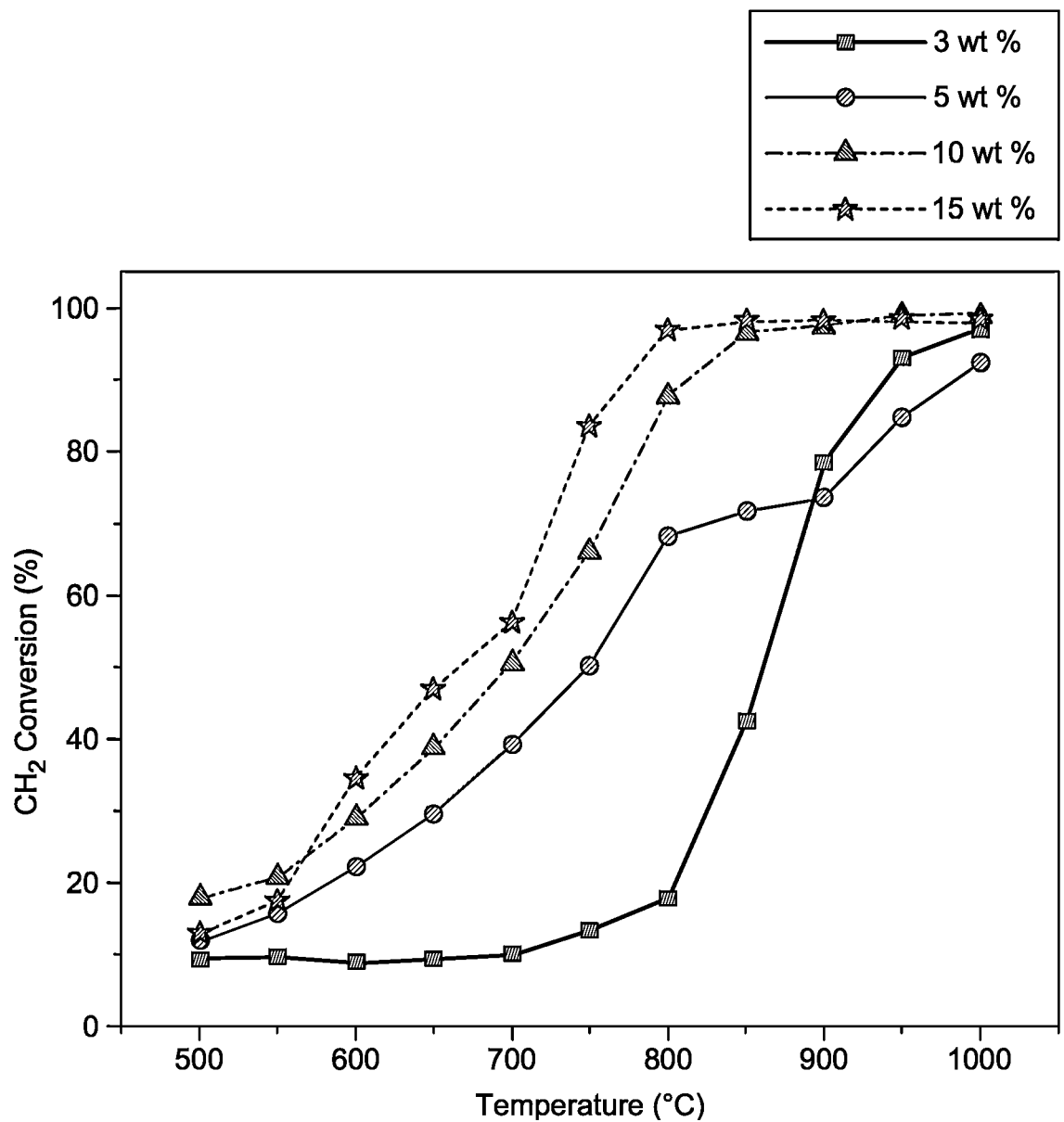
FIG. 9B is a plotted graph depicting the effect of temperature on percentage conversion of carbon dioxide ($CO_2$) with the Ni/FSZ catalyst, according to certain embodiments.
Figure 9C:
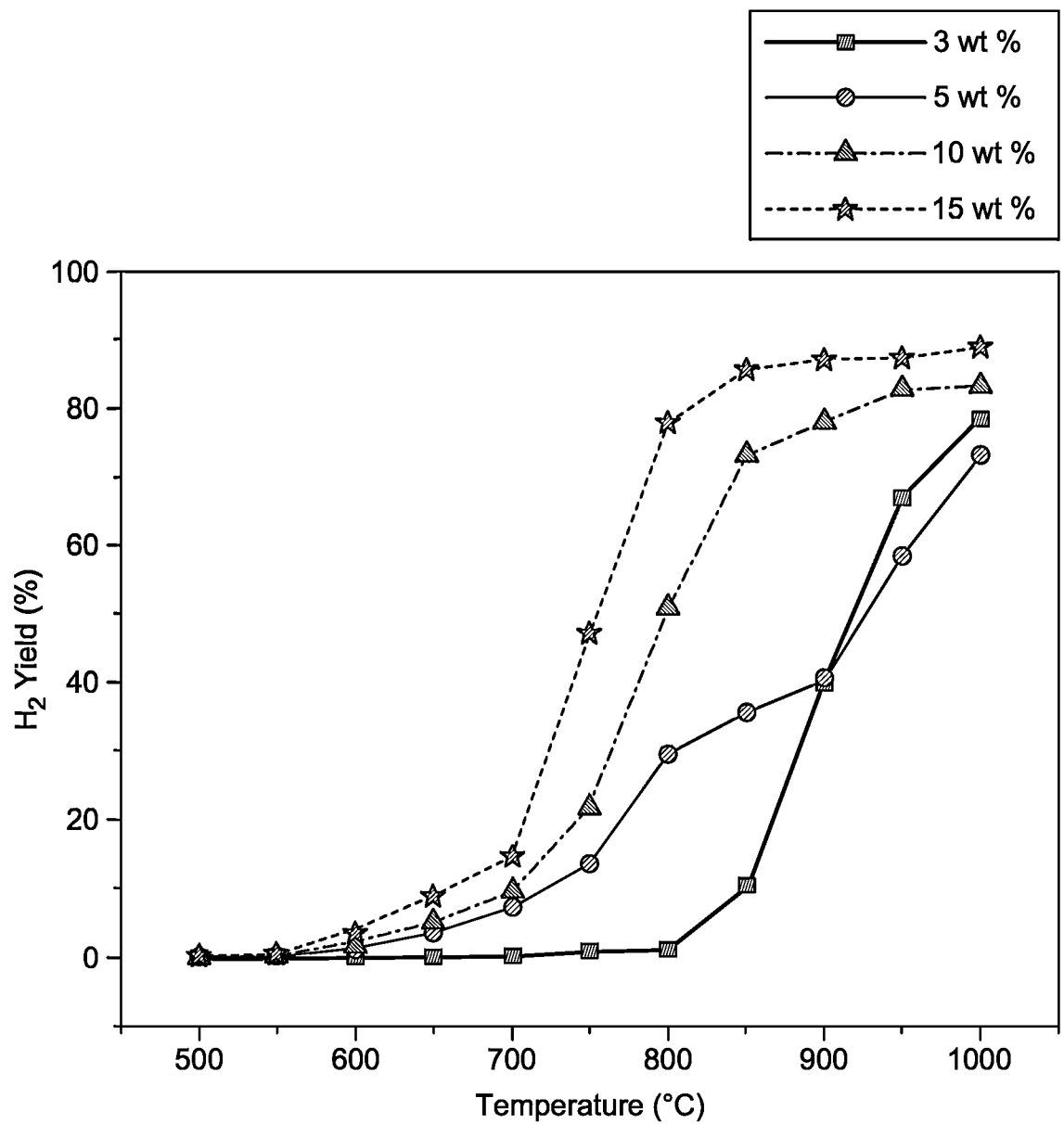
FIG. 9C is a plotted graph depicting the effect of temperature on the percentage yield of hydrogen gas ($H_2$) with the Ni/FSZ catalyst, according to certain embodiments.
Figure 9D:
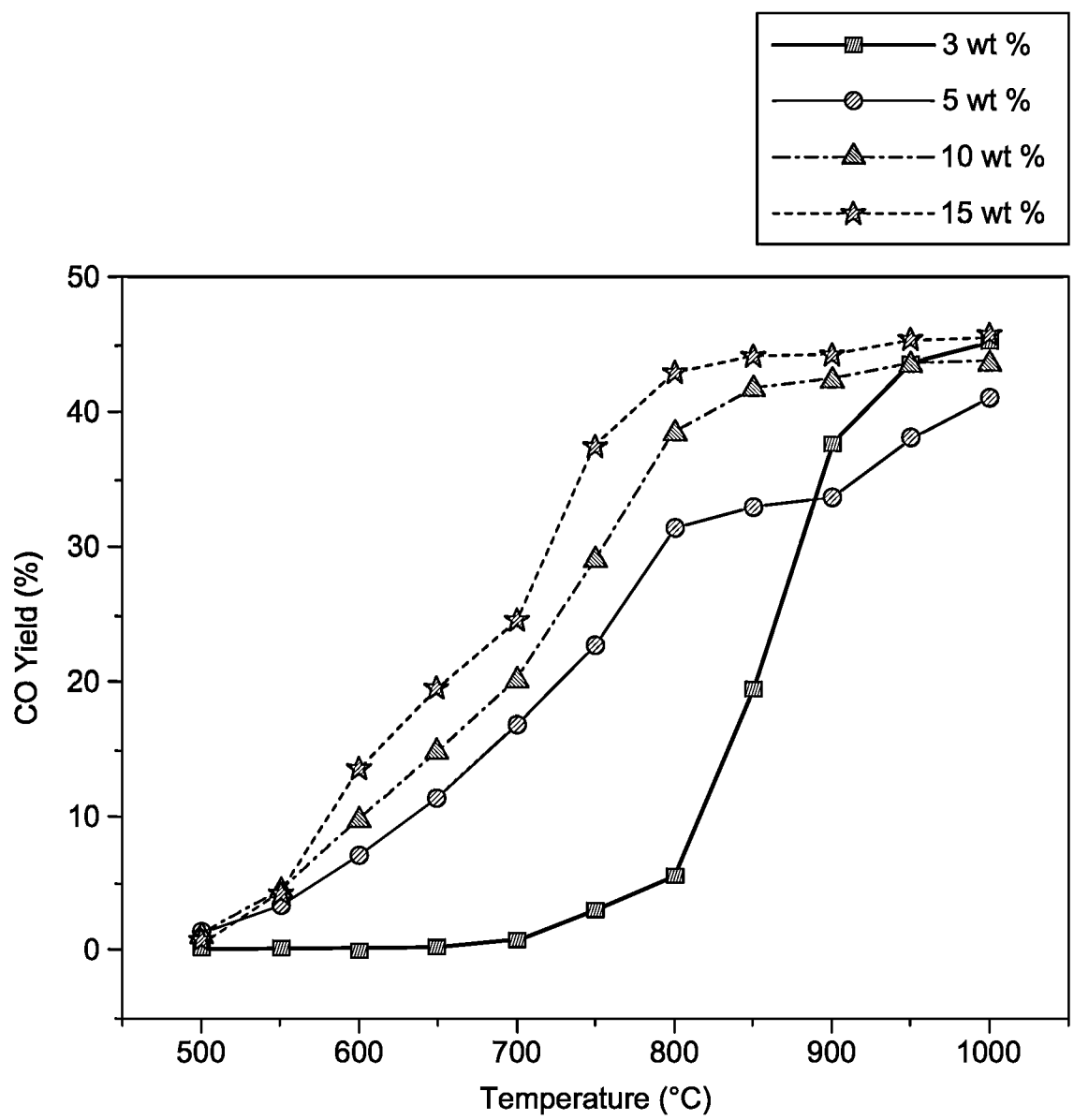
FIG. 9D is a plotted graph depicting the effect of temperature on the percentage yield of carbon monoxide (CO) with the Ni/FSZ catalyst, according to certain embodiments.
Figure 9E:
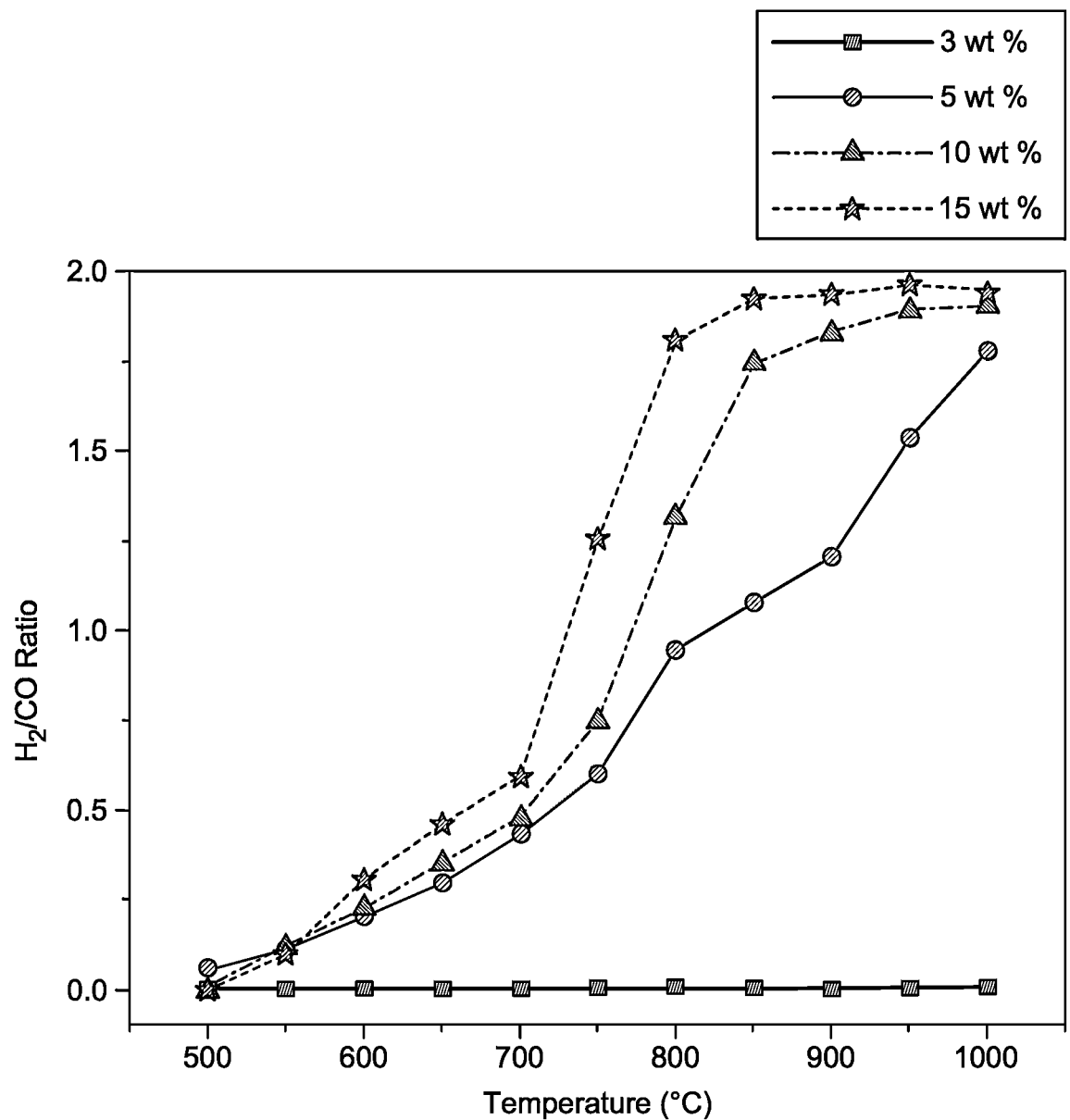
FIG. 9E is a plotted graph depicting the effect of temperature on syngas ($H_2$/CO) ratio with the Ni/FSZ catalyst, according to certain embodiments.
Figure 9F:
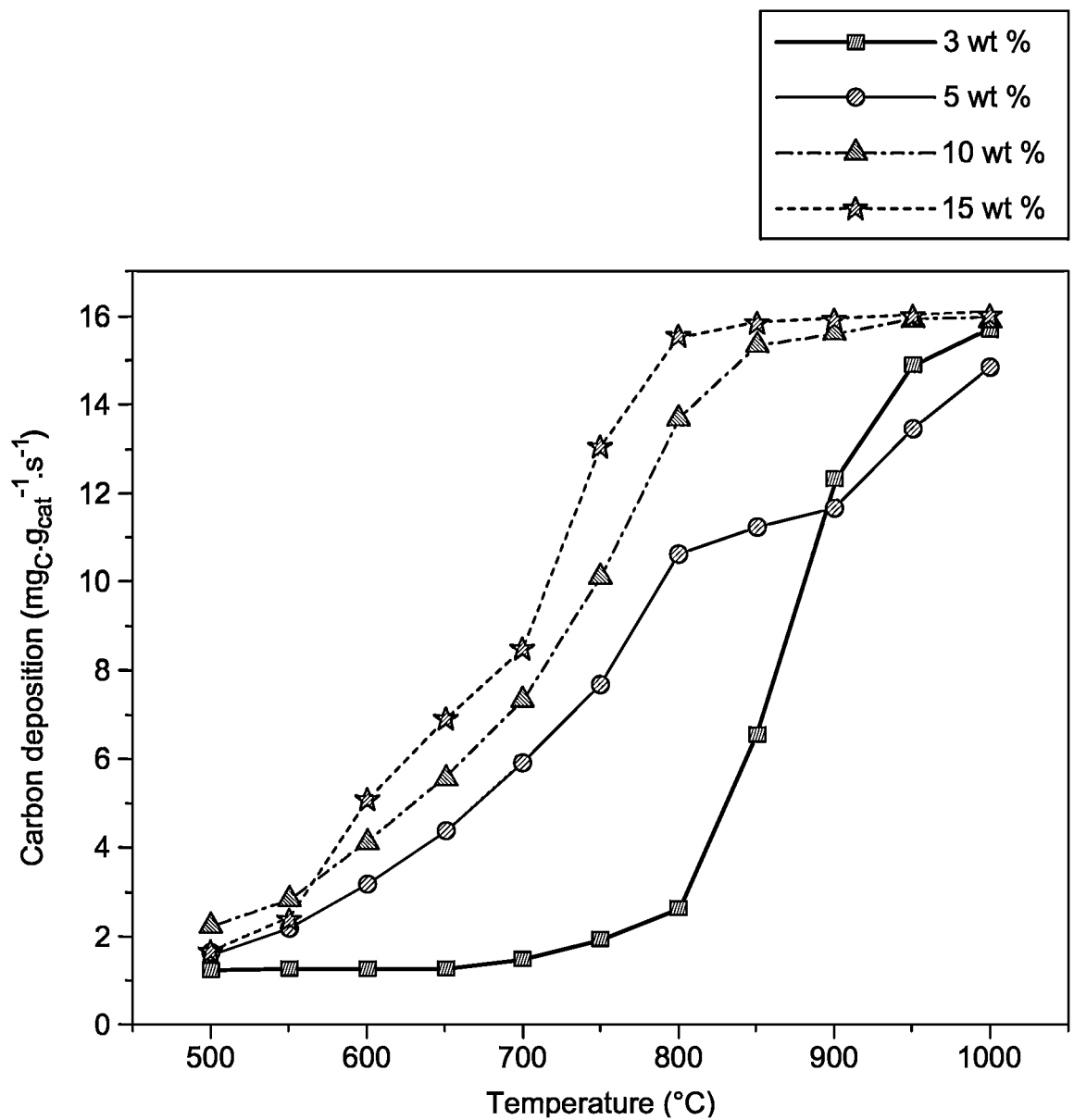
FIG. 9F is a plotted graph depicting the effect of temperature on carbon deposition with the Ni/FSZ catalyst, according to certain embodiments.

FIG. 9A depicts the effect of temperature on the percentage conversion of methane ($CH_4$) and FIG. 9B depicts the effect of temperature on the percentage conversion of carbon dioxide ($CO_2$) with the Ni/FSZ catalyst. The DRM activity of the Ni/FSZ exhibited a dependence on Ni content. As the reaction temperature increased, the % conversion of $CO_2$ and % conversion of $CH_4$ increased for all Ni loadings (3%, 5%, 10%, and 15% Ni). The conversion rates might be relatively low at lower temperatures, indicating sluggish reaction kinetics. The 3Ni/FSZ catalyst converted $CH_4$ and $CO_2$ at 600° C. by 12.8% and 8.8%, respectively, whereas the 5Ni/FSL catalyst converted $CH_4$ and $CO_2$ by 20.5 and 22.2%, respectively, under the same circumstances. When the Ni concentration was raised to 10% under the same circumstances, 25.4% and 28.9% conversion were observed at the same temperature of $CH_4$ and $CO_2$, as shown in FIG. 9A. The $CH_4$ and $CO_2$ conversion dramatically increased as the Ni concentration was raised to 15%, achieving a conversion value of 29% and 34.4% $CH_4$ and $CO_2$, respectively, under the same reaction circumstances shown in FIG. 9B. The $CH_4$ and $CO_2$ conversions raised from 650 to 900° C. for all specimens. The % yield of CO and $H_2$ was also examined for each catalyst. FIG. 9C depicts the effect of temperature on the percentage yield of hydrogen gas ($H_2$), while FIG. 9D depicts the effect of temperature on the percentage yield of carbon monoxide (CO) with the Ni/FSZ catalyst. The 15Ni/FSL had the highest $H_2$ output, at 87.3%. The catalyst with a 15Ni/FSL content showed the highest CO yield, at 45.2% in (FIG. 9D). FIG. 9E depicts the effect of temperature on the syngas ($H_2$/CO) ratio with the Ni/FSZ catalyst. The $H_2$/CO ratio, which was found to depend on Ni content, is another crucial element in DRM, as represented in Table 2. At higher temperatures, the 15Ni/FSL exhibited the best $H_2$/CO ratio, with a value of 1.95, showing the formation of syngas rich in hydrogen. Conversely, as demonstrated in FIG. 9E, the $H_2$/CO ratios for the 3%, 5%, and 10% Ni/FSL were lower. FIG. 9F depicts the effect of temperature on carbon deposition with the Ni/FSZ catalyst. The 15% Ni catalyst might exhibit the highest carbon deposition due to its increased propensity for coke-forming reactions. In contrast, the 5% Ni catalyst could have a comparatively lower % carbon deposition, emphasizing its resistance to carbon accumulation and potential for sustained activity.

TABLE 2

$CO_2$ Conversion (%), $CH_4$ Conversion (%), and % $H_2$/CO Ni/FSZ with 3, 5, 10, and 15% Ni.

| Catalysts | Ni loading (wt. %) | Temperature (° C.) | $CH_4$ Conversion ( %) | $CO_2$ Conversion ( %) | $H_2$/CO |
|---|---|---|---|---|---|
| 3Ni/FSZ | 3 | 700 | 12.7 | 9.9 | 0.00302 |
|  |  | 750 | 15.2 | 13.2 | 0.00135 |
|  |  | 800 | 18.3 | 17.7 | 0.0014 |
|  |  | 850 | 35.6 | 42.4 | 0.0015 |
| 5Ni/FSZ | 5 | 700 | 33.0 | 39.1 | 0.435 |
|  |  | 750 | 42.1 | 50.1 | 0.599 |
|  |  | 800 | 59.5 | 67.9 | 0.946 |
|  |  | 850 | 63.9 | 71.7 | 1.077 |
| 10Ni/FSZ | 10 | 700 | 40.1 | 50.6 | 0.477 |
|  |  | 750 | 56.1 | 66.2 | 0.748 |
|  |  | 800 | 79.9 | 87.8 | 1.32 |
|  |  | 850 | 94.4 | 96.6 | 1.75 |
| 15Ni/FSZ | 15 | 700 | 46.6 | 56.1 | 0.596 |
|  |  | 750 | 74.9 | 83.7 | 1.26 |
|  |  | 800 | 95.4 | 96.8 | 1.81 |
|  |  | 850 | 98.1 | 97.9 | 1.94 |

To conclude, the present disclosure describes silica zinc oxide (Ni/FSZ) catalysts with varying Ni loadings of 3%, 5%, 10%, and 15% for the dry reforming of methane (DRM), and a method for converting $CH_4$ and $CO_2$ into syngas. The impact of Ni loading on catalytic performance, as well as carbon dioxide and methane conversion was described. The catalysts were produced using a microemulsion process, and their microstructure and through an array of characterization techniques, including XRD, TEM, SEM, FTIR, and BET, the structural evolution of Ni/FSZ catalysts during reaction cycles was comprehensively explored. The DRM, a method for converting sustainable energy, enables the production of rich syngas from two abundant resources, $CH_4$ and $CO_2$. The insertion of Ni within catalysts has been shown to facilitate $CH_4$ and $CO_2$ activation, facilitating their conversion into syngas (CO and $H_2$). The results showed that higher Ni loadings led to increased catalytic activity but also promoted carbon deposition and catalyst deactivation. Improved performance was observed at the 10% Ni loading, striking a balance between enhanced reactivity and catalyst stability. In addition, the selectivity for syngas constituents (CO and $H_2$) was Ni content dependent. The 15Ni/FSL catalyst produced the largest amounts of CO and $H_2$, showing improved syngas production. Furthermore, the yield of syngas components was increased by increasing Ni content from 3% to 15% over FSL catalysts. Overall, the 10Ni/FSL and 15Ni/FSL nanocomposites show the most enhanced DRM catalytic activity, with the improved $CH_4$, $CO_2$ conversion, and CO and $H_2$ yield. Therefore, the catalytic performance of the Ni/FSZ catalyst in DRM has been observed to improve due to the synergistic interactions between Ni and the FSZ support. The catalyst has been found to initiate the conversion of methane and carbon dioxide into syngas, making it a suitable and durable DRM catalyst. The utilization of such catalysts may contribute significantly to advancing clean energy technologies and mitigating greenhouse gas emissions.

Numerous modifications and variations of the present disclosure are possible in light of the above teachings. It is therefore to be understood that within the scope of the appended claims, the invention may be practiced otherwise than as specifically described herein.

The invention claimed is:

1. A method for dry reformation of methane (DRM), including:
   introducing a $H_2$-containing feed gas stream into a reactor including a nickel-containing fibrous silica zinc oxide (Ni/FSZ) catalyst;
   passing the $H_2$-containing feed gas stream through the reactor to contact the $H_2$-containing feed gas stream with particles of the Ni/FSZ catalyst at a temperature of from 500 to 900 degrees Celsius (° C.) to form a reduced catalyst;
   terminating the introducing the $H_2$-containing feed gas stream; and
   introducing and passing a mixed feed gas stream including $CH_4$ and $CO_2$ through the reactor to contact the mixed feed gas stream with the reduced catalyst at a temperature of from 500 to 1000° C. thereby converting at least a portion of the $CH_4$ and $CO_2$ to $H_2$ and CO and regenerating the Ni/FSZ catalyst particles to form a regenerated catalyst, and producing a residue gas stream leaving the reactor.

2. The method of claim 1, further includes preparing the Ni/FSZ catalyst by:
   mixing a nickel (Ni) salt, a fibrous silica zinc oxide (FSZ) catalyst, and water to form a first mixture; and
   drying and calcining the first mixture at a temperature of about 700° C.

3. The method of claim 2, wherein the Ni salt includes nickel sulfate, nickel acetate, nickel citrate, nickel iodide, nickel chloride, nickel perchlorate, nickel nitrate, nickel phosphate, nickel triflate, nickel bis(trifluoromethanesulfonyl)imide, nickel tetrafluoroborate, nickel bromide, and/or its hydrate.

4. The method of claim 2, wherein the Ni/FSZ catalyst includes about 15 to 35 wt. % of Zn, 2 to 15 wt. % of Ni, 28 to 48 wt. % of oxygen (O), and 20 to 40 wt. % of silica (Si) as determined by energy-dispersive X-ray spectroscopy (EDS), and each wt. % based on a total weight of the Ni/FSZ catalyst.

5. The method of claim 2, wherein the FSZ catalyst includes about 5 to 30 wt. % of Zn as determined by EDS, and each wt. % based on a total weight of the FSZ catalyst.

6. The method of claim 2, wherein the FSZ catalyst has a porous structure including a plurality of spherical-like lamellar particles having an average particle size of 300 to 500 micrometers (μm).

7. The method of claim 6, wherein each of the plurality of spherical-like lamellar particles includes a fibrous network of interconnected rounded-shaped nanospheres and cockscomb-like nanostructures.

8. The method of claim 2, further includes preparing the FSZ catalyst by:
   mixing urea, a quaternary ammonium surfactant, toluene, an alcohol solvent, and water to form a second mixture;
   mixing zinc oxide (ZnO), a tetraalkyl orthosilicate, and the second mixture at a temperature of from 100 to 150° C. to form a third mixture; and
   calcining the third mixture at a temperature of about 500 to 600° C.

9. The method of claim 8, wherein the quaternary ammonium surfactant is at least one selected from the group consisting of cetyltrimethylammonium bromide (CTAB), cetyltrimethylammonium chloride (CTACl), tetradecyltrimethylammonium bromide (TTAB), tetradecyltrimethylammonium chloride (TTACl), dodecyltrimethylammonium bromide (DTAB), dodecyltrimethylammonium chloride (DTACl), dodecylethyldimethylammonium bromide (DEDTAB), decyltrimethylammonium bromide (D10TAB), and dodecyltriphenylphosphonium bromide (DTPB).

10. The method of claim 8, wherein the tetraalkyl orthosilicate is at least one selected from the group consisting of tetraethyl orthosilicate (TEOS), tetramethyl orthosilicate, tetrapropyl orthosilicate and tetrabutyl orthosilicate.

11. The method of claim 1, wherein $H_2$ is present in the $H_2$-containing feed gas stream at a concentration of 1 to 20 volume percentage (vol. %) based on a total volume of the $H_2$-containing feed gas stream.

12. The method of claim 1, wherein the $H_2$-containing feed gas stream further includes an inert gas selected from the group consisting of nitrogen, argon, and helium.

13. The method of claim 1, wherein the mixed feed gas stream further includes an inert gas selected from the group consisting of nitrogen, argon, and helium.

14. The method of claim 1, wherein the reactor is at least one selected from the group consisting of a fixed-bed reactor, a trickle-bed reactor, a moving bed reactor, a rotating bed reactor, a fluidized bed reactor, and a slurry reactor.

15. The method of claim 1, wherein the reactor is a fixed bed reactor in the form of a cylindrical reactor including:
   a top portion;
   a cylindrical body portion;
   a bottom portion;
   a housing having an open top and open bottom supportably maintained with the cylindrical body portion;
   wherein the Ni/FSZ catalyst is supportably retained within the housing permitting fluid flow therethrough;
   at least one propeller agitator disposed in the bottom portion of the reactor;
   wherein the bottom portion is cone shaped or pyramidal; and
   wherein a plurality of recirculation tubes fluidly connects the bottom portion of the cylindrical reactor with the cylindrical body portion of the cylindrical reactor.

16. The method of claim 1, wherein the passing the $H_2$-containing feed gas stream through the reactor is carried out at a flow rate of about 10 to 30 milliliters per minute (mL/min) at a temperature of about 700° C.

17. The method of claim 1, wherein the passing the mixed feed gas stream through the reactor is carried out at a flow rate of about 10 to 30 mL/min.

18. The method of claim 1, wherein a weight ratio of $H_2$ to CO present in the residue gas stream is in a range of 0.001 to 2.0.

19. The method of claim 1, having a $H_2$ yield of 10 to 90% based on $CH_4$ conversion at a temperature of from 700 to 1000° C., and wherein the $CH_4$ conversion is based on an initial concentration of the $CH_4$ in the mixed feed gas stream.

20. The method of claim 1, having a CO yield of 5 to 49% based on a conversion of $CH_4$ and $CO_2$ at a temperature of from 700 to 1000° C., and wherein the conversion of $CH_4$ and $CO_2$ is based on an initially combined concentration of the $CH_4$ and $CO_2$ present in the mixed feed gas stream.

* * * * *